US007177878B2

(12) United States Patent
Wason

(10) Patent No.: US 7,177,878 B2
(45) Date of Patent: Feb. 13, 2007

(54) SIMPLE PERSISTENCE MECHANISM FOR SERVER BASED WEB APPLICATIONS

(75) Inventor: James R. Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 10/825,417

(22) Filed: Apr. 13, 2004

(65) Prior Publication Data
US 2005/0228822 A1 Oct. 13, 2005

(51) Int. Cl.
*G06F 17/30* (2006.01)
*G06F 17/00* (2006.01)

(52) U.S. Cl. ............... 707/103 R; 707/3; 707/10; 707/102; 709/230; 709/328; 715/513; 717/137; 719/310

(58) Field of Classification Search .......... 707/3, 707/10, 100, 101, 102, 103 R; 709/230, 709/328, 213, 224; 715/513; 719/310; 717/137
See application file for complete search history.

(56) References Cited

U.S. PATENT DOCUMENTS

| 5,991,751 A * | 11/1999 | Rivette et al. ............ 707/1 |
| 6,351,776 B1 * | 2/2002 | O'Brien et al. ............ 709/245 |
| 6,418,448 B1 * | 7/2002 | Sarkar ............ 707/104.1 |
| 6,438,744 B2 * | 8/2002 | Toutonghi et al. ............ 717/137 |
| 6,549,922 B1 * | 4/2003 | Srivastava et al. ............ 707/205 |
| 6,598,052 B1 * | 7/2003 | Saulpaugh et al. ............ 707/102 |
| 6,604,100 B1 * | 8/2003 | Fernandez et al. ............ 707/3 |
| 6,611,844 B1 * | 8/2003 | Saulpaugh et al. ............ 707/103 R |
| 6,618,732 B1 | 9/2003 | White et al. |
| 6,631,519 B1 | 10/2003 | Nicholson et al. |
| 6,643,652 B2 * | 11/2003 | Helgeson et al. ............ 707/10 |
| 6,708,186 B1 * | 3/2004 | Claborn et al. ............ 707/102 |
| 6,772,216 B1 * | 8/2004 | Ankireddipally et al. ... 709/230 |

(Continued)

FOREIGN PATENT DOCUMENTS

WO WO 01/73587 A2 * 10/2001

OTHER PUBLICATIONS

Atkinson, Malcolm et al., "Types and Persistence in Database Programming Languages", ACM Computing Surveys, vol. 19, No. 2, Jun. 1987, pp. 105-190.*

(Continued)

*Primary Examiner*—Shahid Al Alam
(74) *Attorney, Agent, or Firm*—Schmeiser, Olsen & Watts; William E. Schiesser

(57) ABSTRACT

An object oriented method and computer system for implementing a persistence mechanism. The persistence mechanism is adapted to effectuate data transfer between a software application and a relational database. The method identifies homes and relationships. Each identified home includes attributes of a table of the database. Each identified relationship has attributes describing a foreign key interaction between two homes of the identified homes. A provided home class is adapted to be instantiated to any of the identified homes. A query to transfer data between the application and the database is generated such that a first home of the identified homes is processed. The first home includes attributes of a first table of the database. The processing of the first home includes an instantiation of the home class to an instance of the first home by setting attributes of the first home.

40 Claims, 25 Drawing Sheets

U.S. PATENT DOCUMENTS

| | | | |
|---|---|---|---|
| 6,779,025 B1 * | 8/2004 | Wolfe et al. | 709/219 |
| 6,912,691 B1 * | 6/2005 | Dodrill et al. | 715/513 |
| 6,915,304 B2 * | 7/2005 | Krupa | 707/102 |
| 6,917,939 B1 * | 7/2005 | Baer et al. | 707/10 |
| 6,934,749 B1 * | 8/2005 | Black et al. | 709/224 |
| 6,985,927 B2 * | 1/2006 | O'Brien et al. | 709/213 |
| 6,999,956 B2 * | 2/2006 | Mullins | 707/2 |
| 2002/0194357 A1 | 12/2002 | Harris et al. | |
| 2003/0120665 A1 | 6/2003 | Fox et al. | |
| 2003/0182308 A1 | 9/2003 | Ernst et al. | |

OTHER PUBLICATIONS

Bourret, R et al., "A Generic Load/Extract Utility for Data Transfer Between XML Documents and Relational Databases", Proceedings of the Second International Workshop on Advanced Issues of E-Commerce and Web-Based Information Systems, WECWIS 2000, pp. 134-143.*

Damiani, Ernesto et al., "A Fine-Grained Access Control System for XML Documents", ACM Transactions on Information and System Security, vol. 5, No. 2, May 2002, pp. 169-202.*

Gavish, Bezalel, "Optimization Models for Configuring Distributed Computer Systems", IEEE Transactions On Computers, vol. C-36, No. 7, Jul. 1987, pp. 773-793.*

Grant, John et al., "Logic-Based Query Optimization for Object Databases", IEEE Transactions on Knowledge and Data Engineering, vol. 12, No. 4, Jul./Aug. 2000, pp. 529-547.*

Roger Jennings, Optimize Update-Concurrency Tests, Oct. 2003 Issue Technology Toolbox: VB.NET, SQL Server 2000, XML, ADO.NET, 4 pages.

Bath et al., XML Integration Features in ADO 2.5, Jan. 2000, 15 pages.

Broekstra et al., SESAME: A Generic Architecture for Storing and Querying RDF and RDF Schema, 2001 Aidministrator Nederland b.v., 24 pages.

Beckett et al., SWAD-Europe Deliverable 10.2: Mapping Semantic Web Data with RDBMSes, Jan. 23, 2003, 30 pages.

Manning Publications Co., A Case Study: EJB Generation, 2003, pp. 199-212.

* cited by examiner

FIG. 1A

Orders Table

| ONumb | CNumb | Status | Orddate |
|---|---|---|---|
| O0001 | C0005 | PENDING | 2003-10-20-15.12.03.068000 |
| O0002 | C0002 | NEW | 2003-10-20-15.12.03.068000 |
| O0003 | C0001 | BACKORDER | 2003-10-20-15.12.03.068000 |
| O0004 | C0002 | NEW | 2003-10-20-15.12.03.068000 |
| O0005 | C0003 | BACKORDER | 2003-10-20-15.12.03.068000 |

*FIG. 5*

Customer Table

| CNumb | Name | Street | City | State | Zip code |
|---|---|---|---|---|---|
| C0001 | Mary Jones | 101 Software Rd. | Cary | NC | 91234 |
| C0002 | Joe Smith | 102 Software Rd. | Cary | NC | 12345 |
| C0003 | Ralph Jones | 103 Software Rd. | Cary | NC | 23456 |
| C0004 | Susan Jones | 101 Development Lane | Raleigh | NC | 34567 |
| C0005 | Bob Smith | 102 Development Lane | Raleigh | NC | 45678 |
| C0006 | Ken Jones | 105 Development Lane | Cary | NC | 56789 |
| C0007 | Maria Smith | 110 Software Rd | Cary | NC | 67890 |
| C0008 | Randal Jones | 201 Development Lane | Raleigh | NC | 78901 |
| C0009 | Tom Smith | 301 Software Rd | Garner | NC | 89012 |
| C00010 | James Jones | 502 Development Lane | Raleigh | NC | 87312 |

*FIG. 6*

Lines Table

| ONumb | LNumb | INumb | Qty | Ucost |
|---|---|---|---|---|
| 00001 | 1 | P00001 | 5 | 8.00 |
| 00001 | 2 | P00002 | 10 | 9.00 |
| 00001 | 3 | P00003 | 15 | 5.00 |
| 00001 | 4 | P00004 | 20 | 2.50 |
| 00002 | 1 | P00005 | 5 | 18.00 |
| 00002 | 2 | P00006 | 10 | 12.60 |
| 00002 | 3 | P00007 | 15 | 35.00 |
| 00002 | 4 | P00008 | 20 | 40.00 |
| 00003 | 1 | P00009 | 5 | 78.00 |
| 00003 | 2 | P000010 | 10 | 125.00 |
| 00003 | 3 | P000011 | 15 | 62.00 |
| 00003 | 4 | P000012 | 20 | 100.00 |
| 00004 | 1 | P000013 | 5 | 66.75 |
| 00004 | 2 | P000014 | 10 | 28.00 |
| 00004 | 3 | P000015 | 15 | 7.00 |
| 00004 | 4 | P00001 | 20 | 3.50 |
| 00005 | 1 | P00002 | 5 | 2.75 |
| 00005 | 2 | P00003 | 10 | 8.00 |
| 00005 | 3 | P00004 | 15 | 90.00 |
| 00005 | 4 | P00005 | 20 | 15.00 |
| 00005 | 5 | P00006 | 25 | 1.25 |

*FIG. 7*

Catalog Table

| INumb | Description | UCost |
|---|---|---|
| P00001 | belt | 8.00 |
| P00002 | tie | 9.00 |
| P00003 | hat | 5.00 |
| P00004 | socks | 2.50 |
| P00005 | blouse | 18.00 |
| P00006 | sweater | 12.60 |
| P00007 | slippers | 35.00 |
| P00008 | bathing suit | 40.00 |
| P00009 | dress | 78.00 |
| P000010 | dress jacket | 125.00 |
| P000011 | skirt | 62.00 |
| P000012 | sports jacket | 100.00 |
| P000013 | dress shoes | 66.75 |
| P000014 | raincoat | 28.00 |
| P000015 | shorts | 7.00 |
| P00016 | cuff links | 3.50 |
| P00017 | tie clip | 2.75 |
| P00018 | gloves | 8.00 |
| P00019 | running shoes | 90.00 |
| P00020 | scarf | 15.00 |

*FIG. 8*

SIMPLE PERSISTENCE MECHANISM FOR SERVER BASED WEB APPLICATIONS

CROSS REFERENCE TO COPENDING APPLICATIONS

The disclosure of this application is related to the disclosures of the following copending applications:

"Complex Data Navigation, Manipulation and Presentation Support for Visualage Java," Ser. No. 09/615,976, filed Jul. 14, 2000; and "Web and Lotus Notes Adapter Layers," Ser. No. 10/157,262, filed May 29, 2002.

The two above-identified copending applications are hereby incorporated herein by reference in their entirety.

BACKGROUND OF THE INVENTION

1. Technical Field

The present invention relates to an object oriented simple persistence mechanism for effectuating data transfer between a software application and a relational database.

2. Related Art

Object oriented programming systems typically use persistence mechanisms to mediate between Enterprise Java Beans® software applications and relational databases such as DB2®. A persistence mechanism is generic software which functions as an interface and data transfer mechanism between the software application and the database for storing and retrieving data to and from the database. Prominent related art persistence mechanisms include: 1) Persistence Builder by Visual Age; and 2) Enterprise Java Beans® by Sun Microsystems®.

Persistence Builder has been viewed for many years as the persistence mechanism of choice. After introduction of Enterprise Java Beans®, however, the J2EE architecture called for the use of Enterprise Java Beans® in conjunction with servlets or Java Server Pages as the way to develop server based web applications (e.g., applications running under WebSphere®). Nonetheless, both Persistence Builder and Enterprise Java Beans® are deeply flawed and unsuitable for use "as is" in a WebSphere environment. The transaction management provided by Persistence Builder and Enterprise Java Beans® will not function in a clustered WebSphere environment. Enterprise Java Beans® require that each database interaction be broken into a "client" and "server" piece. The interface between the client and server needs to be structured to support an extremely inefficient interface (i.e., remote method invocation or RMI) between the client and server. When the result of a database query is returned by the Enterprise Java Beans® mechanism, only a list of keys to the retrieved objects is returned. A separate call to the database has to be issued to instantiate the bean, and then separate calls need to be issued through a succession of client and server stubs for the individual 'get' methods for each column value. When an Enterprise Java Beans® 'set' method is called, it actually issues an individual database update call for that individual column. This severe inefficiency has made Enterprise Java Beans® very unpopular with web developers.

PersistenceBuilder is somewhat more efficient than Enterprise Java Beans®, and has been fairly widely used. As explained supra, Enterprise Java Beans® do not offer a suitable alternative. PersistenceBuilder has its own problems, mainly its attempts at transaction management which are totally inadequate for a clustered environment (i.e., the transaction information is held in memory on one server, so once an interaction crosses servers it loses all integrity).

There are also numerous failings in both Persistence Builder and Enterprise Java Beans®. Neither provides a way to limit the number of rows returned by a database query, although this is part of the Java JDBC specification. PersistenceBuilder does not provide a way to add search criteria for a query, and adding search criteria for a query is cumbersome using Enterprise Java Beans®. Both Persistence Builder and Enterprise Java Beans® generate large amounts of data handling code with separate classes for each table and separate 'get' and 'set' methods for each column in the table. This code is voluminous and gets in the way of any high level processing.

Both Persistence Builder and Enterprise Java Beans® offer to developers the ability to lay out the database schema and to set up relationships among the tables in the database. However, there are performance penalties in the code that processes these relationships that can outweigh the build-time convenience and there are runtime headaches.

Therefore, there is a need for a persistence mechanism that mitigates or eliminates the aforementioned problems associated with the related art persistence mechanisms.

SUMMARY OF THE INVENTION

The present invention provides an object oriented method for implementing a persistence mechanism, said persistence mechanism adapted to effectuate data transfer between a software application and a relational database, said method comprising the steps of:

identifying homes and relationships, each identified home comprising attributes of a table of the database, each identified relationship having attributes describing an interaction between two homes of said identified homes;

providing a single home class adapted to be instantiated to any of said identified homes;

providing a single relationship class adapted to be instantiated to any one of said identified relationships;

generating a query to transfer data between the application and the database, said generating comprising processing a first home of said identified homes, said first home comprising attributes of a first table of the database, said processing the first home comprising instantiating the home class to an instance of the first home by setting attributes of the first home.

The present invention provides a computer system comprising a processor and a computer readable memory unit coupled to the processor, said memory unit containing instructions that when executed by the processor perform a method for implementing a persistence mechanism, said persistence mechanism adapted to effectuate data transfer between a software application and a relational database, said method comprising the computer implemented steps of:

identifying homes and relationships, each identified home comprising attributes of a table of the database, each identified relationship having attributes describing an interaction between two homes of said identified homes;

providing a single home class adapted to be instantiated to any of said identified homes;

providing a single relationship class adapted to be instantiated to any one of said identified relationships;

generating a query to transfer data between the application and the database, said generating comprising processing a first home of said identified homes, said first home comprising attributes of a first table of the database, said processing the first home comprising instantiating the home class to an instance of the first home by setting attributes of the first home.

The present invention provides a simple persistence mechanism that mitigates or eliminates problems associated with the related art persistence mechanisms.

BRIEF DESCRIPTION OF THE DRAWINGS

FIGS. 1A and 1B depict a panel for implementing a visual editor to define attributes of homes and relationships of the simple persistence mechanism of the present invention.

FIGS. 5–8. depict illustrative database tables for the Example of FIGS. 2–4, in accordance with embodiments of the present invention.

DETAILED DESCRIPTION OF THE INVENTION

The detailed description which follows comprises: a discussion of aspects of object oriented programming systems pertinent to the simple persistence mechanism the present invention; a discussion of the inventive simple persistence mechanism and features thereof; an Example of implementing the inventive simple persistence mechanism; and a computer system for implementing the inventive simple persistence mechanism.

Object Oriented Programming Systems

Object oriented programming systems comprise "objects". An object is a data structure and a set of operations or functions (also referred to as "methods") that can access the data structure. The data structure contains "attributes" of the data therein. The attribute may be a primitive (such as an integer or string) or an object reference which is a pointer to another object. Objects having identical data structures and common behavior can be grouped together into, and collectively identified as, a "class".

Each defined class of objects may be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the name instance, and returning control to the calling high level routine along with the results of the method. The relationships between classes, objects and instances are established during "build time" or generation of the object oriented computing environment, i.e. prior to "run time" or execution of the object oriented computing environment.

In an object oriented computing environment, work is accomplished by sending action request messages to an object which contains data. The object will perform a requested action on the data according to its predefined methods. Objects may be grouped into object classes which define the types and meanings of the data, and the action requests (i.e., messages) that the object will honor. The individual objects containing data are called instances of the class.

Object classes can be defined to be subclasses of other classes. Subclasses inherit all of the data characteristics and methods of the parent class. Subclasses can add additional data and methods and can override or redefine any data elements or methods of the parent class.

Figure 24:
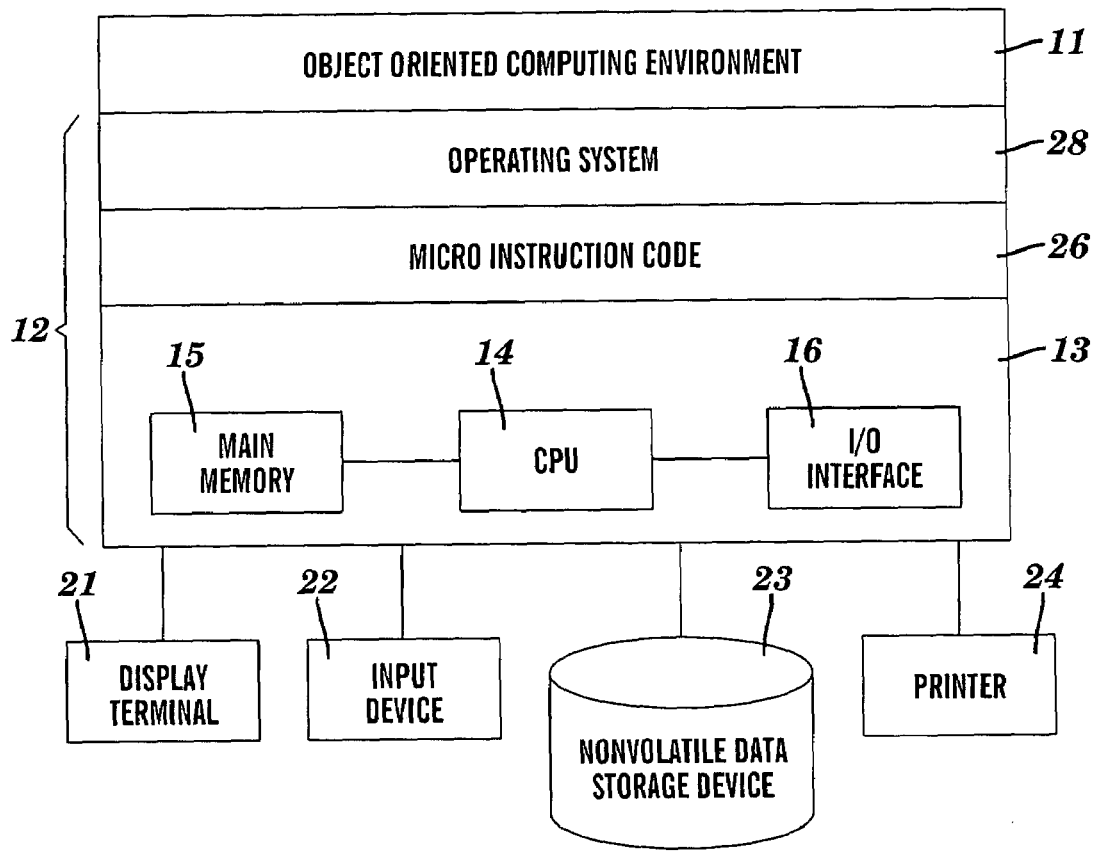
FIG. 24 depicts a hardware and software environment in which the simple persistence mechanism of the present invention operates.

FIG. 24 depicts a hardware and software environment in which the simple persistence mechanism of the present invention operates. In FIG. 24, an object oriented computing environment 11 operates on one or more computer platforms 12. Object oriented computing environment 11 includes an object manager. Computer platform 12 may include computer hardware units 13 such as a central processing unit (CPU) 14, a main memory 15, and an input/output (I/O) interface 16, and may further include peripheral components such as a display terminal 21, an input device 22 such as a keyboard or a mouse, nonvolatile data storage devices 23 such as magnetic or optical disks, printers 24 and other peripheral devices. Computer platform 12 may also include microinstruction codes 26 and an operating system 28. Operating system 28 may exist within the object oriented computing environment 11 and may be written in the Java object oriented programming language.

Simple Persistence Mechanism

A "database" is defined herein and in the claims as a collection of persistent data.

A "relational database" is defined herein and in the claims as a database comprising tables logically linked to each other through common values of the persistent data. The scope of "relational database" includes, but is not limited to, databases managed by commercial relational databases management systems such as, inter alia, DB2® and ORACLE®. The relational database of the present invention is not limited to any particular form.

The "tables" are defined herein and in the claims as entities that store the persistent data, wherein each table expresses associations among attributes and values of the persistent data. A table may be structured as, inter alia, a traditional array of rows and columns wherein each column contains data values having a common attribute and each row describes an association among data values having different attributes. However, a table of rows and columns is not required to store the persistent data in any particular form or to express its associations in any particular form.

A "relationship" is defined herein and in the claims as expressing a logical link between two tables such as, inter alia, a traditional foreign key relationship between an attribute of a source table and a corresponding attribute of a target table.

The present invention discloses a simple persistence mechanism specifically designed for use on a web server in the context of the Enterprise Application Development Platform (EADP) application, which allows the definition of database schema, import and export if the schema from a database, definition of relationships, and conversion from an existing EADP application implemented using Persistence-Builder or Enterprise Java Beans® for its persistence mechanism.

EADP is a development platform for building WebSphere® applications that communicate with the relational database management system DB2®. EADP allows the definition of complex objects, quick views of normalized data, computed and summary fields, keyword fields, and verifications. EADP handles scrolling of large databases, including hyper-scrolling of thousands of records.

All features needed to describe a persistence mechanism are controlled by a datastore, which can be associated to a single relational database. A datastore is a data storage facility, such as a relational data base, flat-file, hierarchical data base, a record file, etc, and a datastore may provides storage for the persistent state of an object. Within the datastore two major types of features are maintained, homes and relationships. A home is associated to a physical database table or additionally as the source of target of a relationship, although some relationships do not require a physical table as the home. Relationships describe an interaction between a source and target home.

A home corresponds roughly to a database table, although some homes do not have physical tables. The home contains information about the table, including its physical name and qualifier, the physical names of its columns, information about their physical properties, and which columns are key columns.

A relationship defines an interaction between a source home and target home. The relationship corresponds roughly to a "foreign key" relationship on the physical database, although some relationships defined within the simple persistence mechanism may have source or target homes that are not mapped to physical tables. Also, the foreign key relationships do not need to be implemented by the underlying database management system. The relationship contains information about the source home, the source key fields, the target home, the target key fields, and the source and target names of the relationship. The source and target names may correspond to the names recognized by EADP within its processing. A relationship has information about which homes it is related to. Each home keeps lists of the relationships for which the home is the source or target home of the relationship.

Unlike other persistence mechanisms, which define a different Java class for each home for each relationship, EADP Simple Persistence has only one relationship class which works for all relationships. Each instance of the relationship class is adapted to a particular relationship by setting the attributes described above. There is no need to generate out classes for each new application that uses the simple persistence mechanism.

Relationships may be characterized by types. A complex object type relationship is a controlling relationship between a source and target of a relationship. For example, a complex object type relationship may pertain to a relationship between "orders" and "line items" such that the orders control the line items. For said complex object type relationship, a line item cannot exist without an order that comprises the line item. Thus, if an order is deleted, then all of the line items belonging to the order must be deleted before the order is deleted.

In contrast, a quick view type relationship is not a controlling relationship between a source and target of the relationship. For example, a quick view type relationship may pertain to a relationship between "orders" and "cus-tomer numbers" such that the orders do not control the customers, and the customers do not control the orders. Thus an order may be specified without specifying the customer, and a customer can be changed for an order without destroying the order.

Figure 22:
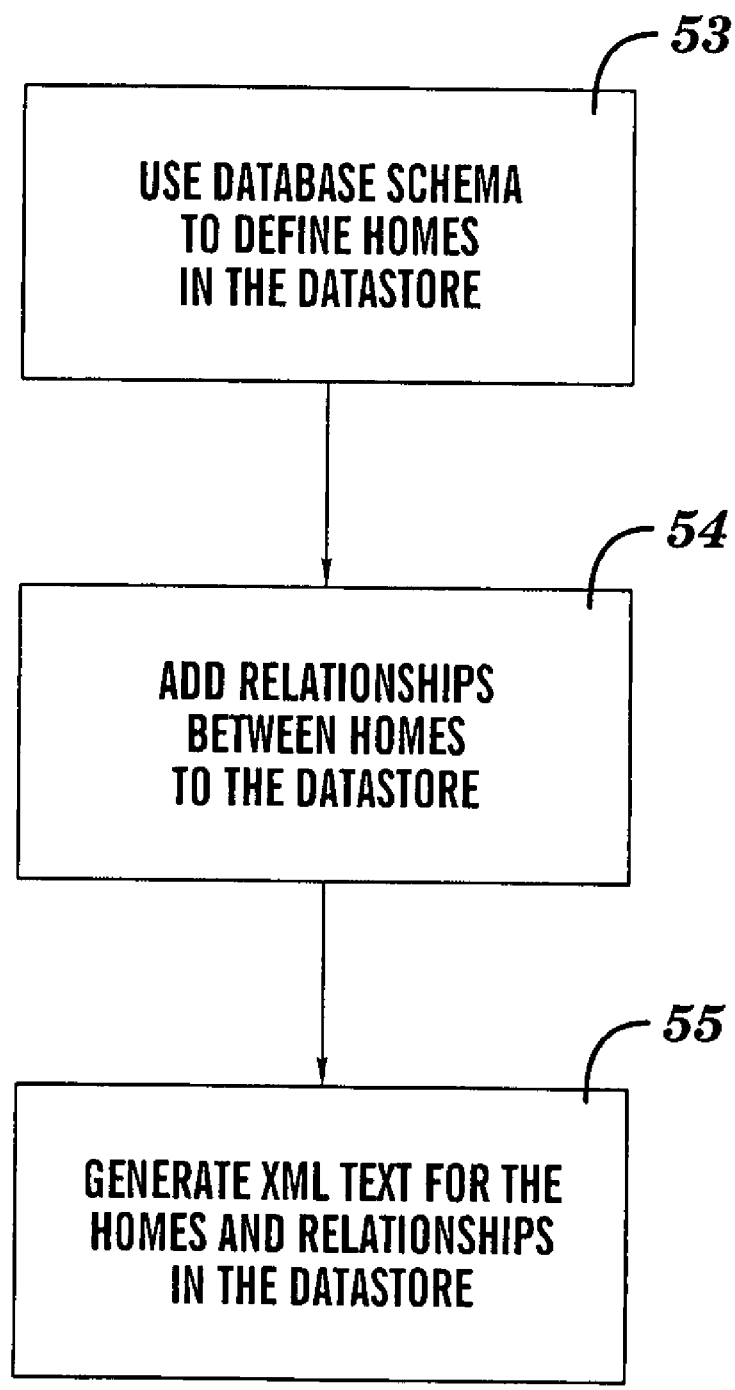
FIG. 22 is a flow chart relating to a buildtime component of the simple persistence mechanism of the present invention.
Figure 23:
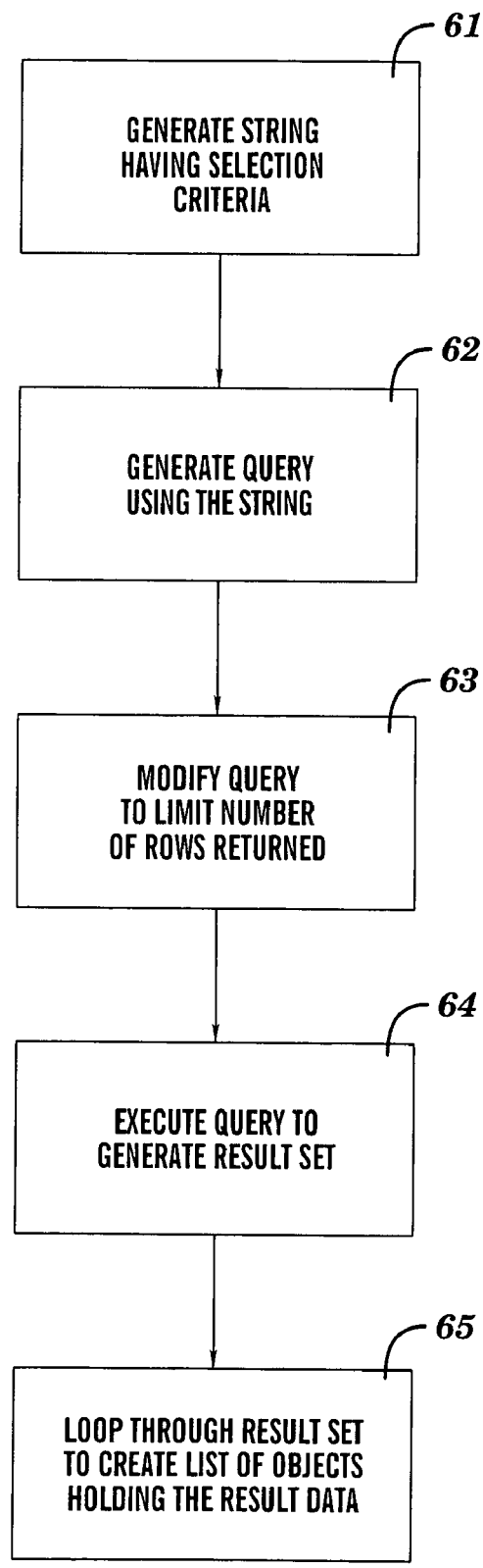
FIG. 23 is a flow chart relating to a runtime component of the simple persistence mechanism of the present invention.

The simple persistence mechanism of the present invention comprises a buildtime component and a runtime component, as depicted in FIGS. 22 and 23.

FIG. 22 is a flow chart relating to the buildtime component of the simple persistence mechanism, in accordance with embodiments of the present invention. FIG. 22 depicts steps 53–55. Step 53 uses database schema to define homes in the datastore. Step 54 adds to the datastore relationships between the homes in the datastore. Step 55 generates eXtensible Markup Language (XML) text for the homes and relationships in the datastore. An Example illustrating implementation of the buildtime process described in FIG. 22 is presented infra in conjunction with FIGS. 2–4.

FIG. 23 is a flow chart relating to the runtime component of the simple persistence mechanism for processing a selection query, in accordance with embodiments of the present invention. FIG. 23 depicts steps 61–65. Step 61 generates a string having selection criteria relating to the query. Step 62 generates a query using the string generated in step 61. Step 63 modifies the query generated in step 62 to limit the number of rows returned as a result of executing the query. Step 64 executes the query of step 63 to generate a result set for the query. Step 65 loops through the result set generated in step 65 to create a list of objects holding the results data for the query. An Example illustrating implementation of the runtime process described in FIG. 22 is presented infra in conjunction with FIGS. 9–17 and also in FIGS. 18–21.

The following features relate to the novel simple persistence mechanism of the present invention:

1. A technique to describe all features needed for a persistence mechanism.
2. A technique to describe attributes for a home.
3. A technique to describe attributes for a relationship.
4. A technique to associate homes to relationships.
5. A technique to hold a memory representation of the data from the database.
6. A technique to provide runtime support for extracting data from the physical database.
7. A technique to provide runtime support for updating data in the physical database.
8. Techniques for working with relationships at runtime:
9. A technique to store persistent data about the homes and relationships in an extensible Markup Language (XML) file.
10. A technique to initialize the datastore with home and relationship data from the XML file.
11. A technique for a visual editor to allow definition of attributes of the homes.
12. A technique for a visual editor to allow definition of attributes of the relationships.
13. A technique to initialize the homes from an existing database schema.
14. A technique to update home and relationship data from an EADP data definition.
15. A technique to convert an EADP based application using PersistenceBuilder or Enterprise Java Beans® to use EADP simple persistence of the present invention
16. A technique to export schema definitions for a home back to the physical database.
17. A technique to provide runtime support to allow EADPSimplePersistence to operate as a bean implementer according to the EADP standard.

The preceding features of the present invention are described next.

Feature 1. A Technique to Describe all Features Needed for a Persistence Mechanism.

Unlike other persistence mechanisms which define a different Java class for each home for each database table, the EADP simple persistence mechanism of the present invention has only one home class which will work for all tables. Each instance of the home class is adapted to a particular table by setting the attributes of the home to match the characteristics of the table. With the present invention, there is no need to generate classes for each new application that uses the simple persistence mechanism.

Table 1 depicts a XML Definition Document Type (DTD) describing the attributes in a datastore.

TABLE 1

```
<?xml version="1.0"?>
<!ELEMENT datastore (dnName,dbUser,dbPassword,
dbDriver,homes,relationships)>
<!ELEMENT dbName (#CDATA)>
<!ELEMENT dbUser (#CDATA)>
<!ELEMENT dbPassword (#CDATA)>
<!ELEMENT dbDriver (#CDATA)>
<!ELEMENT relationships (relationship*)>
<!ELEMENT relationship
(sourcetable,targettable,sourcerole,targetrole,targetkeys,sourcekeys)>
<!ELEMENT sourcetable (#CDATA)>
<!ELEMENT targettable (#CDATA)>
<!ELEMENT targetkeys (key+)>
<!ELEMENT sourcekeys (key+)>
<!ELEMENT key (#CDATA)>
<!ELEMENT homes (home*)>
<!ELEMENT home (tablename,qualifier,datafields,keyfield,
compoundtype)>
<!ELEMENT tablename (#CDATA)>
<!ELEMENT qualifier (#CDATA)>
<!ELEMENT datafields (field+)>
<!ELEMENT keyfields (field+)>
<!ELEMENT field (#CDATA)>
<!ELEMENT compoundtype (typenode+)>
<!ELEMENT typenode (colname,coltype,fieldlength,fieldscale)>
<!ELEMENT colname (#CDATA)>
<!ELEMENT coltype(#CDATA)>
<!ELEMENT fieldlength (#CDATA)>
<!ELEMENT fieldscale (#CDATA)>
```

In Table 1, the first four attributes (dbName, dbUser, dbPassword and dbDriver) of the datastore are used to provide a Structured Query Language (sql) connection from the datastore to a physical database. The rest of the DTD shows that a datastore comprises a set of relationships and a set of homes, which will be infra described in more detail.

The datastore is implemented within the EADP simple persistence of the present invention by the EADPSimpleDatastore, which has as attributes the connection information as strings, and a first list (java.util.Vector) for the homes and a second list for the relationships. The datastore is accessed as a singleton at runtime, so only one instance of a particular home or relationship is ever created on a server node.

Feature 2. A Technique to Describe Attributes for a Home.
Table 2 lists attributes of the home.

TABLE 2

```
<!ELEMENT home (tablename,qualifier,datafields,
keyfield,compoundtype)>
<!ELEMENT tablename (#CDATA)>
<!ELEMENT qualifier (#CDATA)>
```

TABLE 2-continued

```
<!ELEMENT datafields (field+)>
<!ELEMENT keyfields (field+)>
<!ELEMENT field (#CDATA)>
<!ELEMENT compoundtype (typenode+)>
<!ELEMENT typenode (colname,coltype,fieldlength,fieldscale)>
<!ELEMENT colname (#CDATA)>
<!ELEMENT coltype(#CDATA)>
<!ELEMENT fieldlength (#CDATA)>
<!ELEMENT fieldscale (#CDATA)>
```

If the home maps to a physical database table, then the tablename and qualifier correspond to that of the physical table. The field entries under datafields correspond to the physical column names of the table, and the field entries in keyfields correspond to the columns that act as keys (naturally each entry in keyfields also must appear in datafields). Each column has additional descriptive information in a typenode entry in the compoundtype. The colname in the typnode entry matches the field entry in datafields, and coltype is the java,sql.Types definition for the sql type. The fieldlength and fieldscale match the physical representation of the column.

The information stored in the attributes of each home is sufficient to formulate and process the sql queries need for selection, insert, update, and delete from the corresponding table in the physical database. The home is implemented by the EADPSimpleHome class. Each instance of home will have different values for the attributes described here.

Feature 3. A Technique to Describe Attributes for a Relationship.

Table 3 illustrates attributes of the relationship.

TABLE 3

```
<!ELEMENT relationship
(sourcetable,targettable,sourcerole,targetrole,
targetkeys,sourcekeys)>
<!ELEMENT sourcetable (#CDATA)>
<!ELEMENT targettable (#CDATA)>
<!ELEMENT targetkeys (key+)>
<!ELEMENT sourcekeys (key+)>
<!ELEMENT key (#CDATA)>
```

Each relationship entry maps a source to a target, and the attributes of the relationship define how that mapping is done. The sourcetable value corresponds to the tablename value for the source home. The targettable value corresponds to the tablename value for the target home. Of course, both of the homes must appear in the list of homes for the datastore. All relationships are treated as one to many, and the source table has the role of the "one". Each relationship has a source role and a target role (stored in the sourcerole and targetrole values). Within EADP there are four types of relationships that are processed, and each has a special convention for the names of the source and target roles. The four types of relationships are as shown in Table 4.

TABLE 4

| Relationship Type | Source Role | Target Role |
|---|---|---|
| complex object | ruler | subobject(n) |
| quick view | qvsource(n) | qvtarget(n |
| root | vroot | version |
| version | vsosubobject | vsoruler | wherein the (n) indicates an optional numeric suffix to maintain a unique role name.

The source keys entries include the key fields from the source home. The target keys entries are columns in the target key (they do not need to be key columns) such that the value (in the database) for a target key column of a target row matches the value (in the database) of the corresponding source key column in the source row. This mapping allows processing of the two major functions of a relationship. The first major function, given a row in the source table (a "source row") is to find all matching rows in the target table (the "target rows"). The second major function, given a row in the target table (a "target row"), is to find its matching row in the source table (the "source row").

The relationship is implemented by the EADPSimpleRelationship class. Each instance of relationship will have different values for the attributes described here.

Feature 4. A Technique to Associate Homes to Relationships.

A relationship has information about a pair of related homes. Although the home class can be instantiated from the attributes described in its DTD, in order to process efficiently at runtime the home class needs to hold more information in memory. One of the important extra attributes the EADPSimpleHome class receives at runtime is the instance of its owning datastore (i.e., the singleton for the datastore that is processing on the server node). This datastore instance acts as an anchor point to be able to access all the other homes and relationships for that datastore.

Each instance of the home class maintains two lists (java.util.Vector): one list of source relationships, and the other list of target relationships. These lists are created by "lazy initialization"; that is, they are initially set to null, and the first request for information results in the creation and population of the list. It is done this way, because the datastore needs to be fully initialized before these lists can be accurately populated. Since initialization of the datastore involves creation of its various home and relationships, it is possible that a home could be instantiated before all relevant information relating to that home has been instantiated. So the lazy initialization provides a convenient method of deferring some parts of initialization until they can be properly processed.

When the source relationship list is initialized for a home, all relationships for the datastore are examined to see if the source table in the relationship matches the table name for the home. If so, that relationship is added to the list.

When the target relationship list is initialized for a home, all relationships for the datastore are examined to see if the target table in the relationship matches the table name for the home. If so, that relationship is added to the list.

Feature 5. A Technique to Hold a Memory Representation of the Data from the Database.

The EADPSimpleObject is a class which holds in memory the data for one single row of a result set (or marshals data for an update). Unlike other persistence mechanisms which use one or more Java class types for each database table, EADP Simple Persistence uses only the EADPSimpleObject class type for all types of tables. There is no need to generate classes for each new application that uses the simple persistence mechanism of the present invention.

The technique of holding a memory representation of the data from the database is simple with the present invention. This area has been the subject of much obfuscation and extraneous processing in other persistence mechanisms such as Persistence Builder and Enterprise Java Beans®. Both of these (i.e., Persistence Builder and Enterprise Java Beans®) generate data handling classes for each type of table for this purpose, and not just one class per table. Persistence Builder generates ten classes for the purpose of holding data (corresponding to EADPSimpleObject) plus two additional classes for the home and one for the key. Enterprise Java Beans® generate seven classes for the object: six for the home, and one for the key. The "object" classes are generated with separate get and set methods for each column, making it very difficult to do higher level processing of the data. These classes are useless and extraneous. In contrast, the EADP simple persistence mechanism of the present invention represents a great advance in technology merely by getting rid of the multiple object classes.

Thus, the EADPSimpleObject class is capable of storing in its instances data for any row from any table processed through EADPSimplePersistence, so that no other class types need to be generated. This is accomplished through three attributes: the home, a fields list of column names, and a data array of Java objects. An instance of the EADPSimpleObject class points to the home (corresponding possibly to a physical database table) for the data. The fields list of column names is derived from the datafields list for the owning home and is initialized from datafields list when the home attribute is assigned. The data array of Java objects holds the column data, and the index of the data in the array matches the index of the column name in the fields list. The EADPSimpleObject class also provides methods, described infra, to move data in and out of the data array.

Feature 6. A Technique to Provide Runtime Support for Extracting Data from the Physical Database.

The EADPSimpleHome class provides methods for generating the sql query strings needed to execute a database selection query, and related classes within the simple persistence mechanism execute the query and return the results. The results are returned as a list of EADPSimpleObject instances.

Within Java there is a well defined set of classes (in the java.sql package) that provide a standard way for Java code to access relational databases. This Java functionality is commonly referred to as Java Database Connectivity (JDBC). Various database such as DB2® implement the interfaces specified by JDBC, and one thing that must be specified when establishing a connection from Java code to a database is the "driver" which points to the specific vendor code for that database. The driver information is an attribute of the datastore.

Additionally, the datastore has the name of the database, the user id and the password needed to establish a connection to the physical database. Before attempting to retrieve data, a connection (i.e., an instance of java.sql.Connection) needs to be established. Establishing a connection is an expensive process, and the EADP simple persistence mechanism efficiently pools and reuses the connections that it has already established.

The simple persistence mechanism of the present invention processes the queries in a manner that is uniquely simple and efficient. As described supra in conjunction with FIG. 23, what is needed to process a selection query is to: create a string with the selection criteria, the table name, and the host variable names to be retrieved; create a prepared statement using that string; limit the number of rows returned to a specified maximum (which is omitted by all other persistence mechanisms); execute the query; and loop through the result set to create a list of objects holding the result data for each row in internal representation.

EADP simple persistence processes of the present invention execute queries within the context of the EADPSimpleHome and the EADPSimpleObject. Instances, and not new class types, are adapted to each type of table that needs to be processed. As described supra, each home gets the qualifier, table name, and the list of column names assigned as attributes upon initialization. This information is enough to generate the first part of the query (i.e., what is called in EADP the allInstancesString) as follows.

SELECT T1.(column name 1), T1.(column name 2) . . . , T1(column name n) from (qualifier).(table name) T1

For example,

SELECT T1.OBJDATE, T1.OBJNAME, T1.OBJVAL FROM TMT.OBJPERS T1 where TMT is the qualifier, OBJPERS is the table name, and the column names are OBJDATE, OBJNAME, and OBJVAL.

The fragment of XML that initializes the home used here is shown in Table 5:

TABLE 5

```
<home>
  <tablename>OBJPERS</tablename>
  <qualifier>TMT</qualifier>
  <datafields><field>OBJNAME</field><field>OBJDATE
  </field><field>OBJVAL</field></datafields>
  <keyfields><field>OBJNAME</field></keyfields>
  <compoundtype>
    <typenode><colname>OBJNAME</colname><coltype>1</coltype>
    <fieldlength>200</fieldlength><fieldscale>0</fieldscale></typenode>
    <typenode><colname>OBJDATE</colname><coltype>93</coltype>
    <fieldlength>26</fieldlength><fieldscale>6</fieldscale></typenode>
    <typenode><colname>OBJVAL</colname><coltype>2004</coltype>
    <fieldlength>3000000</fieldlength><fieldscale>0</fieldscale>
    </typenode>
  </compoundtype>
</home>
```

Although it doesn't require much time to generate the selection string, in order to avoid even the slightest loss of performance compared to having the string declared as an instance attribute in a generated class, the "all instances" string is stored as an instance variable in the home that is initialized through lazy initialization. Since the home is addressed as a singleton, the string needs to be generated only once on the server.

The present invention discloses an important performance enhancement for "root" homes. In EADP a root relationship is defined for version controlled tables to provide a source for the logical key for the relationship. For example, the datahead table might have docunid as its "logical" key, but because it is version controlled it adds inserted as a second key to allow for versions. However, other objects need to point to datahead using only docunid as the source key (for example the docaccess table). To get this to work, an extra "root" table (dbroot) is introduced that only has docunid as the key. This then can serve as the source home for the relationships that only use the logical key.

The root table does not have any additional data in it, and EADP Simple Persistence allows it to be treated as a virtual table, For list selections, it does this by generating a query to get data from its underlying "real" table. For example, the "all instances" string for dbroot would actually be generated as:

SELECT DISTINCT T1.DOCUNID FROM TMT.DATA-HEAD T1.

The XML text describing the homes and relationships is shown for reference Appendix A.

The selection string for all instances is passed back to EADP processing for list selections, and becomes the starting point for EADP functions that add selection information, order by information, and more. Another use for the selection string is for the "find by key" queries that use the key fields to generate out the selection information and then use a passed key to fill in the information. There is a performance enhancement however if the find is to find the source row for a relationship. In this case, a Binary Large Object (BLOB) column (such as the OBJVAL column in the example home) is replaced with a one byte array (i.e. BLOB(x'11')). This avoids bringing in unneeded large volumes of data just to navigate a relationship for other purposes.

The executeSelect method in the EADPSimpleHome class is used to process all selection type queries. It takes as input a selection string which is passed from the rest of EADP processing and the maximum number of rows to fetch. The selection string may have used the all instances string to start out and added more information. A connection to the physical database is obtained from the connection pool in the datastore, and this connection and the selection string are used to create a prepared statement. The maximum number of rows to fetch is then assigned to the prepared statement to limit the query results. This simple step, which is important when dealing with large databases, is not provided by either Persistence Builder or Enterprise Java Beans®. In fact, Type 2 Enterprise Java Beans® have taken deliberate steps to make it impossible to limit the results of queries, thereby making themselves totally useless for enterprise scale applications.

Next, the query is executed. An instance of the EADPSimpleResultTable class is used to process the result set. Its fetchNextRow method is used to create an instance of EADPSimpleObject to hold the data for each returned row, and the returned rows are passed back in a vector. The fetchNextRow method calls the gatherValues method on the EADPSimpleObejct, uses the information from the home (the list of data fields and the sql type information for each field stored in the compound type) to extract the data for the column from the sql result set, convert it to an appropriate internal format, and assign it into the data array. There is special logic for BLOB and Character Large Object (CLOB) data which need to be cast into byte arrays to process properly.

Feature 7. A Technique to Provide Runtime Support for Updating Data in the Physical Database.

The EADPSimpleHome class provides methods for generating the sql query strings needed to execute a database insert, update or delete query, and related classes within the simple persistence mechanism execute the query. The pattern is very similar to that for retrievals. There is a string required for each type of query which has constant content. Next presented some examples of queries for the same table:

An insert query string, for example:
INSERT INTO TMT.OBJPERS (OBJNAME, OBJVAL, OBJDATE) VALUES (?, ?, ?)

An update query string, for example:
UPDATE TMT.OBJPERS SET OBJVAL=?, OBJDATE=?

A delete query string, for example:
DELETE FROM TMT.OBJPERS

As with the static part of the selection query string, these query strings are stored as instance attributes in the singleton home for each table, so that they are generated only once per server (this avoids even the minimal overhead of generating the strings from the qualifier, table name, and column values). Note that the insert query includes column references for all column names in the datafields for the home, while the update query includes only datafields which are not key fields.

The update and delete queries also need a "where" clause based on the values of the key columns for the row being updated or deleted. This is not static data. A method (update-WhereClause) which takes an instance of EADPSimpleObject as a parameter (this is the row to be updated or deleted) is used to generate this part of the string.

A JDBC prepared statement is created using the string, and in the case of an insert or update it is assigned host variable values from the row to be updated. Note that the compound type information from the XML that initializes the datastore provides all the information needed to do this, so that all the code needs to create, populate, and execute the queries can be written once with the methods of the EADPSimpleHome. This avoids the unneeded overhead of generated update classes and methods for each different table in the database.

Note that the home uses the "current session" assigned to the home to get the JDBC connection needed to execute the updates. This session is associated to an EADP transaction which is being committed, and which allows uniform commit or rollback of all the insert, update or delete queries within that transaction scope.

Feature 8. Techniques for Working with Relationships at Runtime:

8a. Finding a Relationship where the Given Home is the Target Home and the Given Role is the Source Role.

This relationship is needed to locate data in the "source" row. For example, if an orders row needs to bring in customer data via an EADP defined quick view, the quick view column would be named (e.g., qvsource:address) to get the customer address. The first step in finding the data is to find the relationship associated to qvsource. This relationship has the orders home as the target home, so a lookup is made in the target relationships on the orders home to find the customer with source name qvsource. This frequent pattern of requests is optimized within the simple persistence mechanism of the present invention.

8b. Finding a Relationship where the Given Home is the Source Home and the Given Role is the Source Role.

Finding this relationship is a first step in retrieving the target rows (e.g., all the orders for a particular customer). The source relationships for the home are examined to see which source relationship has the source name.

8c. Finding the Source Row for a Relationship Given a Target Row.

An example of finding the source row is finding the customer row for an order. The first step is to find the relationship as described in the step associated with feature 8b, described supra. The target keys information in the relationship is used to find the values, and the source keys is used to find the column names, to form a "find by key" "where" clause for the selection. This is then processed by the selection query methods on the source home to find the source row.

8d. Finding the Target Rows for a Relationship Given the Source Row.

An example of finding the target row is finding the orders for a customer. The first step is to find the relationship as described in the step associated with feature 8b, described supra. The source keys information in the relationship is used to find the values, and the target keys is used to find the column names, to form a "where" clause for the selection. This is the processed by the selection query methods on the target home to find the source row.

8e. Optimizing Techniques 8a–8d so that Only Key Information is Used and Unneeded Data is Not Retrieved from the Database.

Note that in the description for feature 8d, the values required for the "where" clause always come from key fields. In the step for feature 8c, the values may come from key fields (always will come from key fields for version or complex object relationships). This distinction is important because the "given" row (i.e., the target row for the step of feature 8c and the source row for the step of feature 8d) is actually stored in an EADP bean wrapper which has the key to the bean and the bean itself. When the bean wrapper is serialized to survive crossing sessions in a clustered environment, the bean part is discarded and only the key survives. So it is important to derive data from the key, to avoid the overhead of reconstituting the bean.

In the case where the relationship is a root relationship, the source row consists entirely of its key fields. So if the requirement is to find the source row given the target row, there is no need to do a database retrieval. The source row is simply created using the values of the target key fields. These are also key fields in the target row, so in this case everything is done from keys rather than beans.

8f. Optimizing Techniques 8a–8d so that Large Data Objects (BLOB data) is Not Retrieved Unless Needed.

If a source row containing a BLOB column is retrieved during relationship processing, the BLOB column name is replaced by BLOB(x'11') in the sql string for the query.

Feature 9. Storing Persistent Data about the Homes and Relationships in an XML File.

The DTD for the XML file has been described supra in conjunction with Table 1. In practice, the first four entries (i.e., the connection information) are not stored in the generated XML file. The XML file is generated from an instance of EADPSimpleDatastore held in memory with all of its relationships and home initialized. The getXml method on the EADPSimpleDatastore generates the datastore, relationships, and homes tags, and then loops through its contained home and relationships, calling the getXml method on each. These generate on the tags for the rest of the attributes Feature 10. A Technique to Initialize the Datastore with Home and Relationship Data from the XML File.

This feature is used at runtime to initialize the datastore from metadata stored in the XML file. The datastore, home and relationship classes all have setFromXml methods. These methods make extensive use of the parsing methods provided by the EADPStringReader.

Feature 11. A Technique to Present a Visual Editor to Allow Definition of the Attributes of the Homes.

This feature allows the addition and modification of fields within a home or the definition of a completely new home. Other persistence mechanisms which allow visual editing of the schema have a complicated set of visual parts devoted to this task. For example, PersistenceBuilder has one view to show tables in the schema, then a separate view to show an individual table, then another to update an individual field. There is another view in PersistenceBuilder to deal with key fields.

Figure 1A:
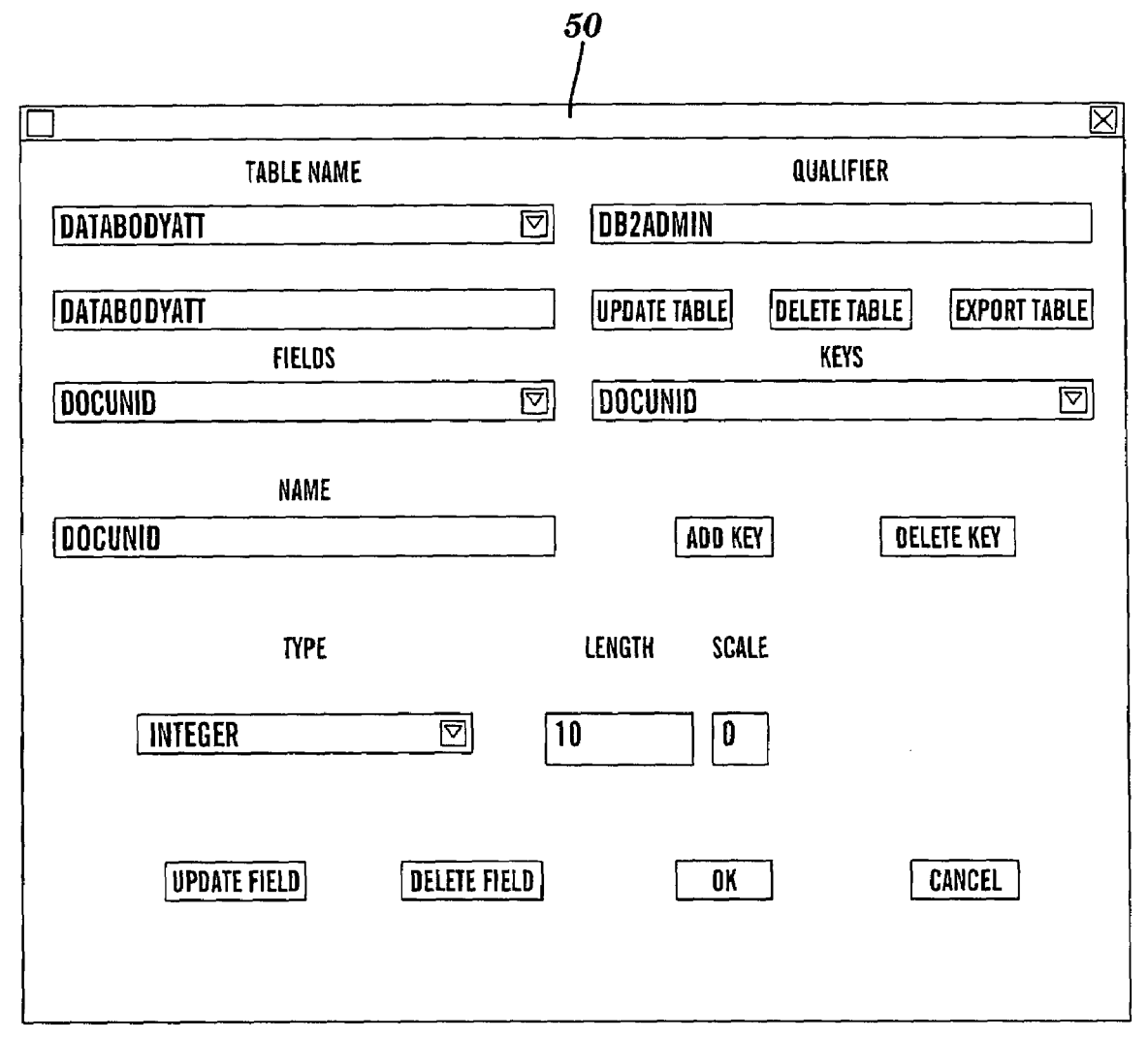

In EADP simple persistence of the present invention, all of such tables and fields are handled by one panel, such as the panel shown in FIG. 1A in accordance with embodiments of the present invention. In FIG. 1A, a drop down list at location 50 at the top of the panel shows all homes defined so far. When a home is selected, its table name goes into the entry field just below. This field can also be used to define a new table name to start a new home. When a home is selected, its data fields go into the Fields drop down list. When a field is selected, its compound type data is used to fill in the name, type, length and scale fields. These fields can be updated, and putting a new value in the name field adds a field with that name to the home. If a field is selected from the fields list, pressing the Add Key button will add the selected field to the list of key fields. The list of key fields is initialized with the key fields for the home. A field can be deleted from the list of key fields by pressing the Delete Key button. A field can be deleted from the home by pressing the Delete Field button. A home can be deleted from the datastore by pressing the Delete Table button. This visual control provides complete update capability for all the attributes specified for the home in the DTD.

Feature 12. A Technique to Present a Visual Editor to Allow the Definition of the Attributes of the Relationships.

As with homes, related art persistence mechanism tend to have overly complicated presentations to update relationships. For example, in PersistenceBuilder the relationship needs to be defined at both the model and schema level, and then mapped one to another in the mapping visual editor. This is made all the more complicated for EADP users because the EADP relationships need special role names in order to fit into the rest of EADP processing.

Figure 1B:
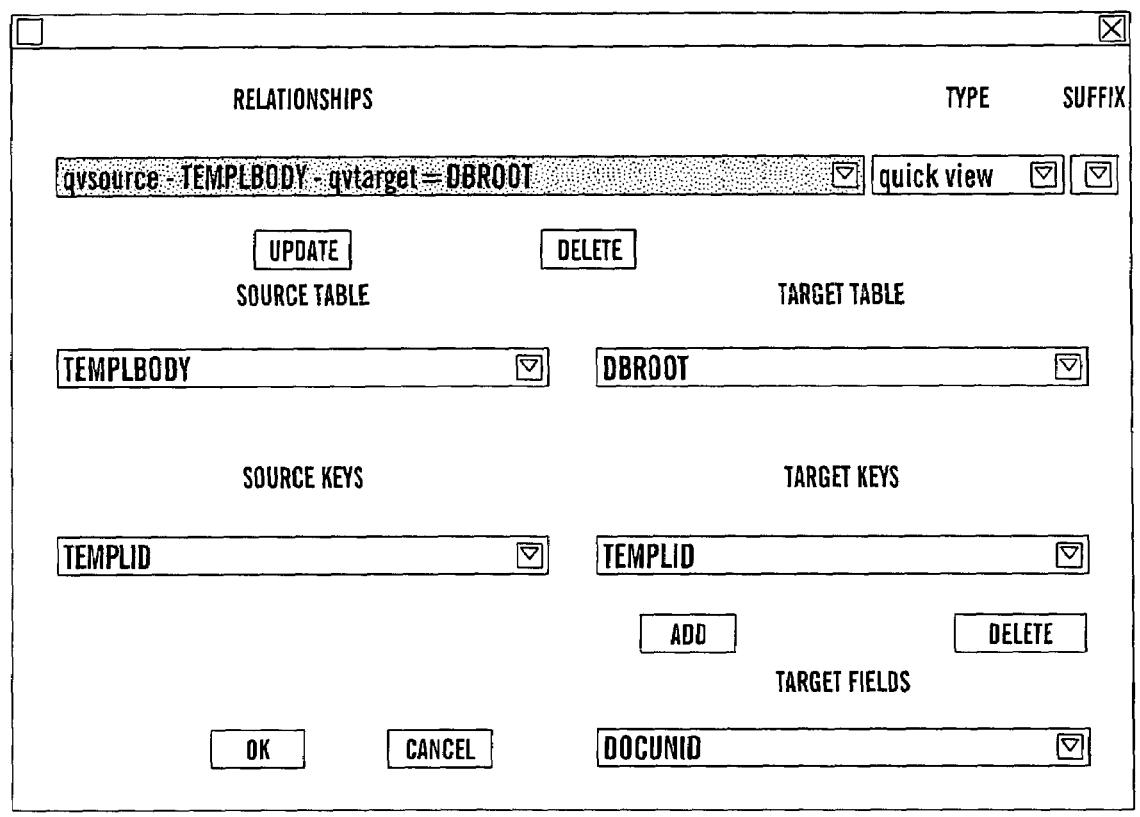

EADP simple persistence of the present invention provides a one panel interface that makes this all very convenient, such as the panel shown in FIG. 1B in accordance with embodiments of the present invention. In FIG. 1B, the existing relationships are displayed in a drop down list that shows the source role, source home, target role, and target home. The Type field shows the type of the relationship, and the Suffix field displays the suffix if there is a suffix. Selection of a relationship from the list selects the source and target tables from the drop down list of homes, and fills in the other fields. A new relationship can be defined by selecting a source and target home, a relationship type, and a suffix. Selecting the source home fills in the list of source keys from the key fields for the home. The target fields are filled in from the data fields for the target home. The Add button adds the selected target field as a target key, and the Delete button removes the selected target key. The Update button under the list of relationships updates an existing relationship or adds a new one, and the Delete key under the relationship list will delete the selected relationship. The panel of FIG. 1B allows complete control of the attributes for a relationship specified in the DTD for the datastore XML.

Feature 13. A Technique to Initialize the Homes from an Existing Database Schema.

This feature maps the database tables to homes, the database columns to data field attributes, and any fields defined as primary keys to key fields. The JDBC interface provides well defined interfaces to the metadata definitions of an existing physical database. The procedure is to first set the connection information in the datastore so that the datastore can connect to the physical database. The datastore then calls the jdbc connection getMetadata to get the metadata, and then calls the getTables method on the metadata to get a result set that has information on the database tables. The schema (which maps to the qualifier) and the table name for each row in the result set are used to initialize a home.

Feature 14. A Technique to Update Home and Relationship Data from an EADP Data Definition.

The complex object definition for the application is used to fill out the key definitions for the homes, to find any virtual homes not physically present in the database, and map any relationships defined in EADP to relationships in the simple persistence mechanism.

In an EADP based application, a complex object structure is associated to the data definition class (child of EADPDatabaseDefinition) to provide runtime information about the various database tables processed by the application. For EADP applications that use PersistenceBuilder or Enterprise Java Beans® as the persistence mechanism, the purpose of associating a complex object structure to the data definition class is to hold information that has been extracted from the generated data handling classes (using Java reflection) and store it in a convenient format for use at runtime. This information is very similar to what is contained in the XML file for the simple datastore, and this information can be used to initialize the datastore when it is available.

The complex object structure comprises a set of complex object nodes, where each node corresponds roughly to a physical database table. The node has information about the table names, the columns and their data types, and relationships where the given node is the target. There are some limitations, however, since all the fields names are stored in "model" format (i.e., lower case and with the underscores removed). Also, columns that are the targets of relationships do not appear as fields in the complex object node, except indirectly as the target columns of the relationship. For this reason the preferred technique is to initialize the homes first from the physical database as described supra to determine the physical names of the columns, which may include underscores. The complex object can then be used to fill in information about keys (which may not be declared in the database schema) and relationships.

There are some homes (e.g., the source of root relationships) which may have neither a physical database table nor a complex object node. Such homes can, however, be detected because the key fields that contribute to their target home have a field name that starts with "vroot?" (e.g. vroot?docunid). These clues are used to set up these "root" homes and their corresponding relationships to the target home.

Feature 15. A Technique to Convert an EADP Based Application Using PersistenceBuilder or Enterprise Java Beans® to Use EADP Simple Persistence.

This feature is accomplished by a first step and a second step. The first step creates the home and relationships for the datastore by importing the metadata from the database. The second step adds information from the EADP database definition. Once the datastore is set up, the application can run using Simple Persistence.

The first and second steps, described supra for Feature 15, are used to initialize a simple datastore for the application, which is then stored as XML. The application can then use EADP simple persistence of the present invention as its persistence mechanism.

Feature 16. A Technique to Export Schema Definitions for a Home Back to the Physical Database.

The simple datastore view has a method to generate a table creation sql string from its compound type information. This feature is connected to the export button. This feature can be used to allow the visual editor for the datastore to update column definitions, add columns, or even add an entirely new table.

Feature 17. A Technique to Provide Runtime Support to Allow EADPSimplePersistence to Operate as a Bean Implementer According to the EADP Standard.

This feature involves providing a connection class, a bean implementer class, and a row data helper class.

EADP has a well defined interface for "bean implementers" that allows it to use different persistence mechanisms such as PersistenceBuilder and Enterprise Java Beans®. This involves providing a "connection" class that is a child of EADPConnection, and "row data helper" class that is a child of EADPRowDataHelper, a "bean implementer" class that is a child of EADPBeanImplementor, and a persistence specific child of EADPPersistentObject.

The EADPSimpleConnection is a child of EADPConnection. It has as properties (customizable through Java bean customization): the database name, database user, password, connection, and the simple datastore. The simple datastore has a special editor to call the visual editors for the homes and relationships.

There are three "virtual" datastores in EADP, used for dynabeans (to retrieve a bean initialization string from a database table), for sql utilities (to perform sql functions such as count), and for categories (to process category information stored in a distinct set of database tables). These datastores need to be connected to the "real" physical database. For the EADPSimpleConnection, the procedure is to use the EADP complex object definition associated to these virtual datastores to add their homes and relationships to the "real" datastore. There are three methods, categoryConnection, dynabeanConnection and uitilitiesConnection on the EADPConnection class which need to be redefined to set the virtual datastore from the real datastore. These methods are redefined for the EADP SimpleConnection to add the relationships and homes for the virtual datastore to the real datastore.

The persistence mechanism is customized to be EADP simple persistence by making the connection in the data definition an instance of EADPSimpleConnection. The connection class acts as the factory class for the bean implementer, and the EADPSimpleConnection returns an instance of EADPSimpleBeanImplementor as its bean implementer class.

The EADPSimpleBeanImplementor is a child of EADPBeanImplementor. When the data manager (instance of EADPDAManager) wants to do anything related to database access, it does it through the services of its associated bean implementer class. The connection class acts as the factory class for the bean implementer, so the pattern is that the data manager asks its encloser (a child of EADPApplicationClass) which asks its definition class (usually a singleton that is a child of EADPDatabaseDefinition) which asks its connection class (in this case an instance of EADPSimpleConnection). This is how the persistence implementation is isolated from the rest of processing. The bean implementer also acts as the factory class for creating instances of EADPPersistentObject, and it will return a child of EADPPersistentObject adapted for that persistence mechanism (in this case an instance of EADPSimplePersistentObject).

The EADPSimpleBeanImplementor implements the following methods:
1) getHomePart, which uses the table name of the data manager to find the instance of EADPSimpleHome in the list of homes in the datastore.
2) getEADPHome, which calls getHomePart.
3) getSelectString and setSelectString, which is an additional selection string (with the WHERE and ORDER BY information) that is added to the base selection string returned by the getSelectString method on the simple home. Before the allInstances method is called, the data manager sets this additional select string in the bean implementer.
4) beanRawAllInstancesSqlString, which returns the getSelecfString from the simple home.
5) beanAllInstancesSqlString, which returns the getSelecfString from the simple home plus the selection and order by information form the selection string stored here.
6) allInstances, which calls the parent allInstances if operating remotely, If local, it call executeSelect on the related instance of EADPSimpleHome using the beanAllInstancesSqlString and the max rows information stored here.
7) findByKey methods. There are several variations on this that all use the findByKey method for a simple home. The difference is which home is used.
8) The EADPPersistentObject is a child of EADPPersistentObject. The EADPPersistentObject sets the row data helper in its current datamanager to be an instance or EADPSimpleRowDataHelper (which completes the linkage to the classes for simple persistence). The commitRow method which has most of its function defined in EADPPersistentObject is redefined here to call the appropriate update method (executeInsert, executeUpdate or executeDelete) on the EADPSimpleHome instance for the table for the row being updated.
9) There are two relationship related methods, subCollection and targetCollection, which have particularly simple implementations using the facilities of EADPSimpleRelationship. For both relationship related methods, the current row (the instance of EADPPersistentObject on which the relationship is called) plays the role of the source row, and the method is passed the target role for the relationship and the data manager for the target. The target role name is used to find the relationship (the instance of EADPSimpleRelationship) and its source keys are used to find the source key values from the source row. These methods are then used to find a list of target rows, which are packaged into bean wrappers (instances of EADPBeanWrapper) and returned.

The EADPSimpleRowDataHelper is a child of EADPRowDataHelper. A "row data helper" implements the following methods:
1) createFromRow, which creates a new instance of EADPSimpleObject from data in the passed EADPPersistentObject. The table name for the data manager for the persistent object is used to find the right home, and this is used to create a new simple object for that home. It is then filled in with data from the persistent object.
2) createRootFromRow; if there is a root relationship, its source home is used to create a new simple object.
3) getValue, which takes a column name (which may come in lower case and without underscores) and finds the matching physical column name. getValue then uses the index of that column in the list of data fields to find the value in the data array. There are a few complications, since the column name that comes in may include the source role of a relationship, possibly followed by a question mark and a field name (for example qvsource or ruler?docunid). If the field name that comes in does not have a matching column name, the first portion of it (up to the first question mark) is used to find a relationship for which the current home is the target and the prefix is the source role. From this, the source keys and the target keys can be determined. What happens next depends on whether there is a field name after the question mark. If there is, and the field name is one of the source keys, the value from the corresponding target key is returned, without any need to find the source row. This approach is much more efficient than anything that can be provided using Enterprise Java Beans® or PersistenceBuilder. If there is no field name after the question mark and if the field name is not one of the source keys, then the source row is retrieved using the facilities of the relationship object. The source row is returned if there is no field name, or the getValue method on the source row is called passing the field name to return the data for that field.

4) setValue, which takes a column name (which may come in lower case and without underscores) and a value. setValue finds the matching physical column name, and then uses the index of that column in the list of data fields to set the value for that index in the data array. There are a few complications, since the column name that comes in may include the source role of a relationship, possibly followed by a question mark and a field name (for example qvsource or ruler?docunid). If the field name that comes in does not have a matching column name, the first portion of it (up to the first question mark) is used to find a relationship for which the current home is the target and the prefix is the source role. From this, the source keys and the target keys can be determined. The value that is passed is an instance of EADPBeanImplementor. Because of serialization, the bean part of this may be null. However, the logical key will be populated with the key values, and this is all the needs to be present. There is no need to reconstitute the bean (which saves a considerable amount of processing). Again, this is much more efficient than what can be accomplished using Enterprise Java Beans® or PersistenceBuilder, which always require the full bean to be present to examine its values. What happens next depends on whether there is a field name after the question mark. If there is, what is passed is the value for just that one field, the field name is one of the source keys, and the value from the corresponding target key is set from the value. If there is no field name after the question mark, what is passed is a bean wrapper. The information about source keys and target keys in the relationship is used to extract the data for each source key from the key in the bean wrapper, and to set the corresponding target key field to that value. Thus, the key field is adapted to be serialized and maintained between successive sessions during which the method is deployed such that data associated to the key field does not have to be reconstituted in said successive sessions.

EXAMPLE

Figure 2:
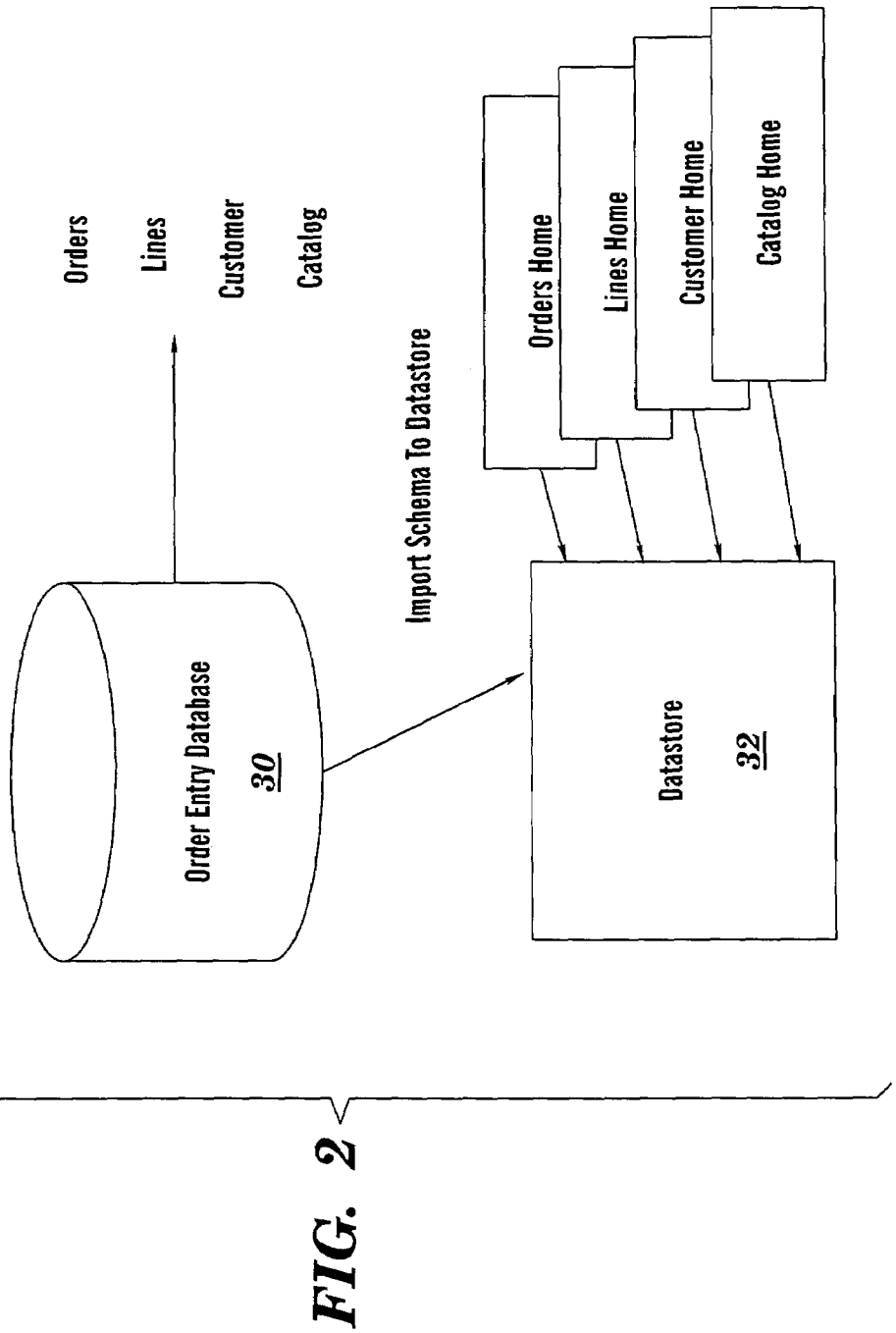
FIG. 2–4 show steps for defining the datastore at buildtime in an Example, in accordance with embodiments of the present invention.
Figure 3:
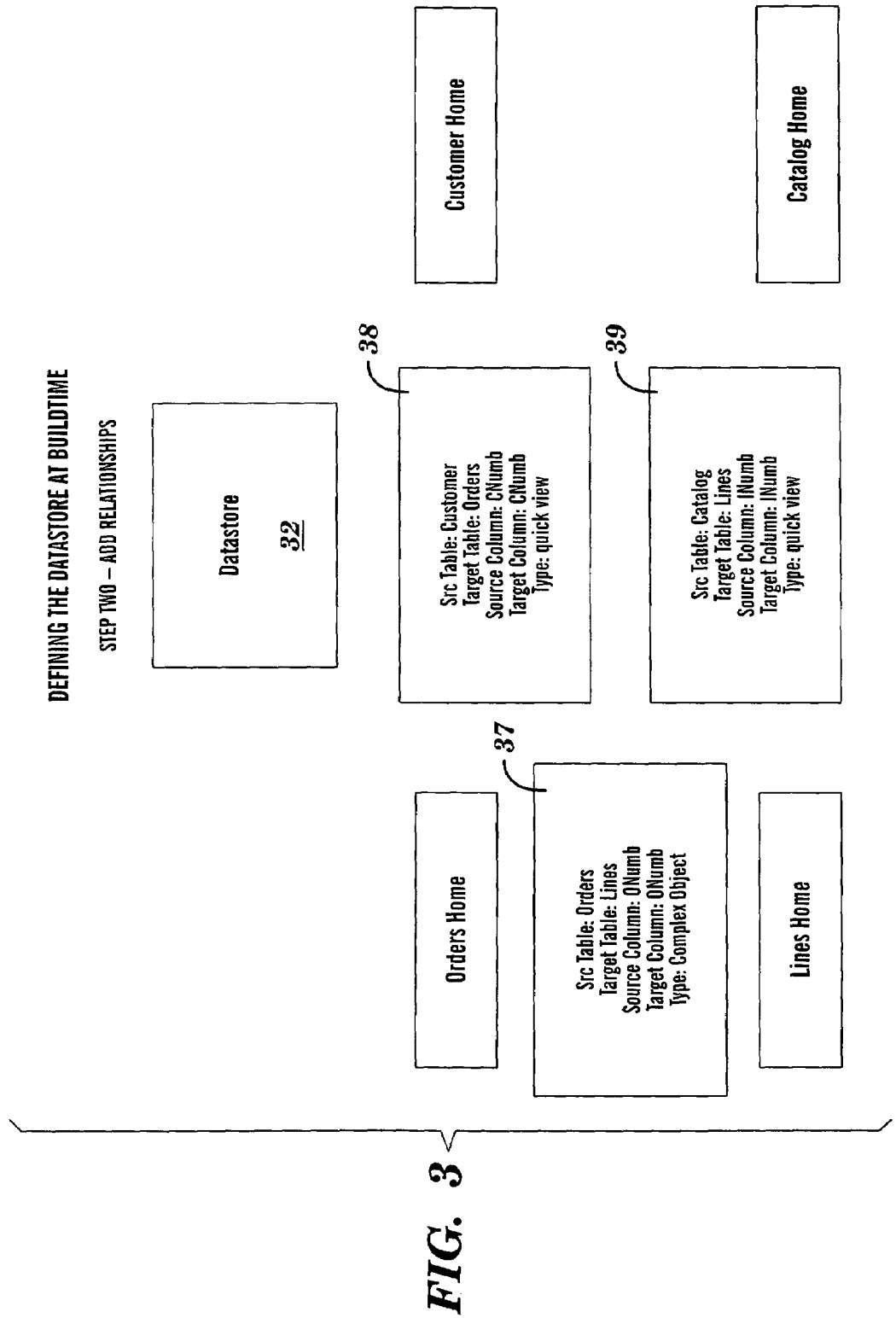
Figure 4:
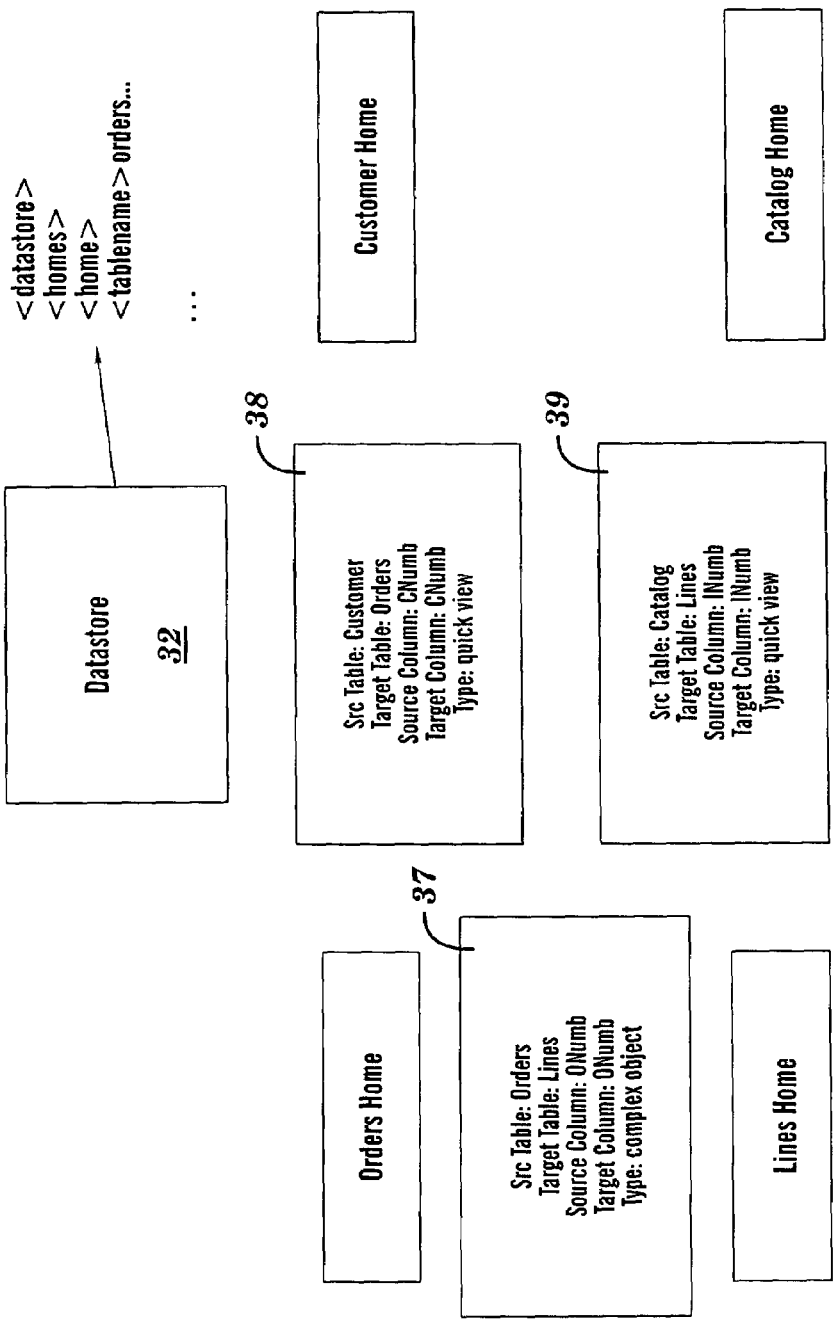

FIG. 2–21 depict an Example relating to processing orders of items of clothing and clothing accessories from a catalog, in accordance with embodiments of the present invention. FIG. 2–4 show steps for defining the datastore at buildtime, as an illustration of the flow chart of FIG. 22, described supra. FIGS. 5–8 depict illustrative database tables, with columns and rows, for this Example. FIGS. 9–17 depict sequential steps relating to a runtime process of retrieving lines for an order for this Example buildtime, as an illustration of the flow chart of FIG. 23, described supra. FIGS. 18–21 sequential steps relating to a runtime process of retrieving a list of orders for this Example buildtime, as another illustration of the flow chart of FIG. 23, described supra.

FIG. 2 depicts step one at buildtime, namely exporting schema (i.e., table attributes or metadata) of database tables Orders, Lines, Customer, and Catalog tables from a database 30 to a datastore 32. The Orders, Lines, Customer, and Catalog tables have associated homes of Orders home, Lines home, Customer home, and Catalog home, respectively. Note that Lines pertain to line items. Thus step one specifies the homes that are so exported from the database 30 and inserts the exported homes into the datastore 32. Note that in this Example, the database 30 stores data relating to items of clothing as may be seen from inspection of the Catalog table in FIG. 8.

FIG. 3 depicts step two at buildtime, namely defining relationships between pair of tables identified in FIG. 2. In particular, FIG. 3 depicts: relationship 37 between the Orders home (source) and the Lines home (target); relationship 38 between the Customer home (source) and the Orders home (target); and relationship 39 between the Catalog home (source) and the Lines home (target). The Source Column and Target Column identifies a column in the source table logically linked to a column in the target table. The Source column has the functionality of a primary key in the source table. The Target Column has the functionality of a foreign key in the target table that links to the Source Column. Although in relationship 37—37, the Source and Target Columns have the same identifiers, the Source and Target Columns may have different identifiers. In the relationship 37, ONumb (i.e., order number) links the Orders and Lines homes and corresponding tables. In the relationship 38, CNumb (i.e., customer number) links the Customer and Orders homes and corresponding tables. In the relationship 39, INumb (i.e., catalog number) links the Catalog and Lines homes and corresponding tables.

Relationships 37, 38, and 39 have the Type of complex object, quick view, and quick view respectively. Thus, the complex object type of relationship 37 implies that the orders control the line items, so that a line item cannot exist without an order that comprises the line item. The quick view type of relationship 38 implies that an order may be specified without specifying the customer number (i.e., CNumb), and a customer number can be changed for an order without destroying the order.

FIG. 4 depicts step three at buildtime, namely generation of XML text (shown in Appendix B) that stores the Orders, Lines, Customer, and Catalog homes, and associated relationships 37–39 for the datastore 32. Thus, the datastore 32 holds the XML text which describes the homes and relationships. Note that the following correspondences hold for column names appearing in Appendix B and FIGS. 3–8: ORDER_NUMBER in Appendix B corresponds to ONumb of FIGS. 3–8; CUSTOMER_NUMBER in Appendix B corresponds to CNumb of FIGS. 3–4; ITEM_NUMBER in Appendix B corresponds to INumb of FIGS. 3–8; ORDER_LINE_NUMBER in Appendix B corresponds to LNumb of FIGS. 3–8; QUANTITY in Appendix B corresponds to Qty of FIGS. 3–8; and PRICE in Appendix B corresponds to Ucost of FIGS. 3–8.

FIGS. 5–8 depict illustrative database tables of the columns and rows of the Orders, Lines, Customer, and Catalog tables for this Example. In FIGS. 5–8, ONumb denotes order number, CNumb denotes customer number, INumb denotes catalog number, Qty denotes quantity ordered, U cost denotes unit cost, and Description describes the items of clothing and clothing accessories in the catalog as a function of catalog number INumb.

FIGS. 9–17 depicts sequential steps 1–9, respectively, of a runtime process of retrieving lines for an order (i.e., order O0001).

Figure 9:
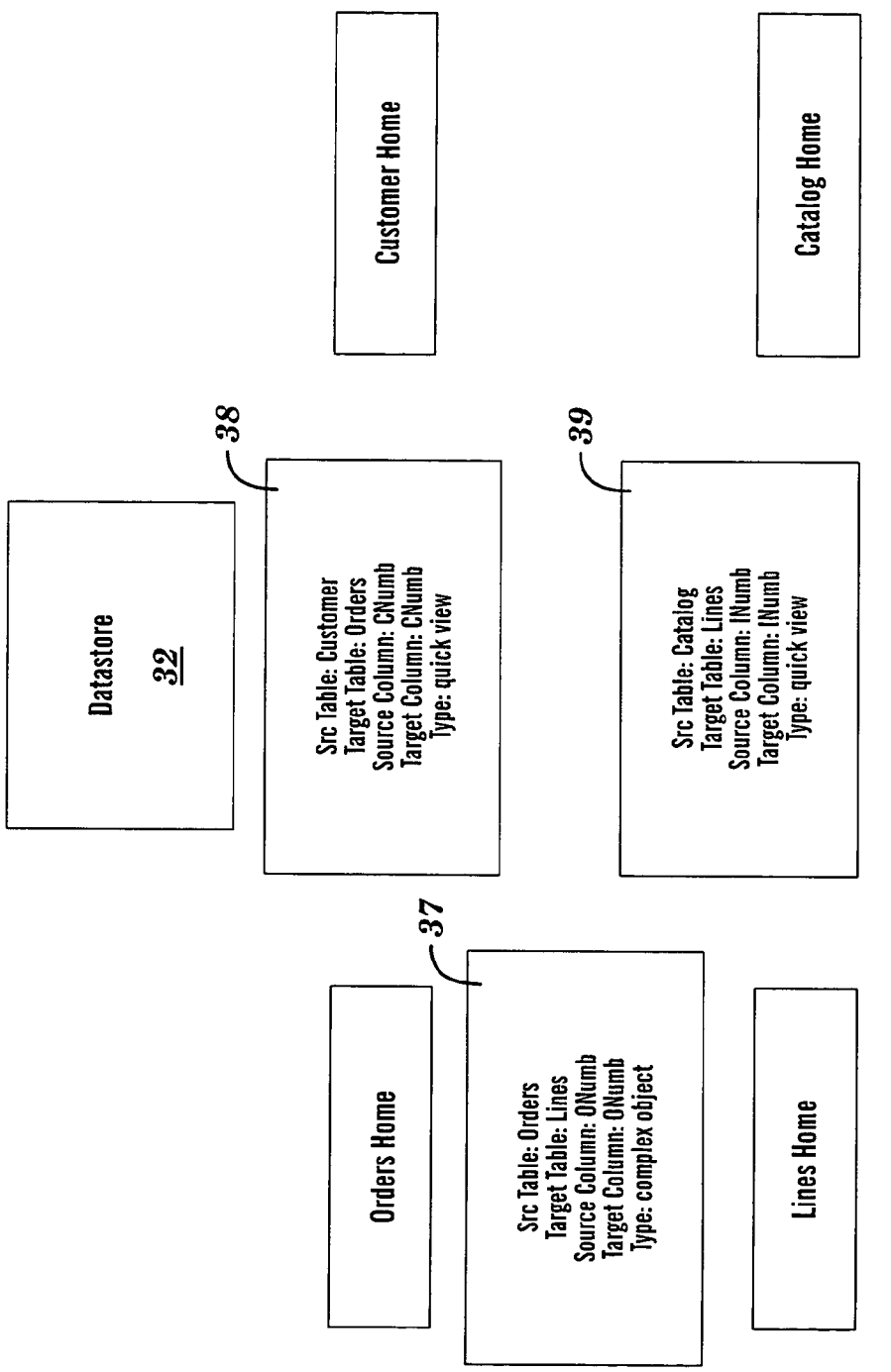
FIGS. 9–17 depict sequential steps relating to a runtime process of retrieving lines for the Example of FIGS. 2–4, in accordance with embodiments of the present invention.

In FIG. 9, step 1 finds the relationship 37, given the source table Orders.

Figure 10:
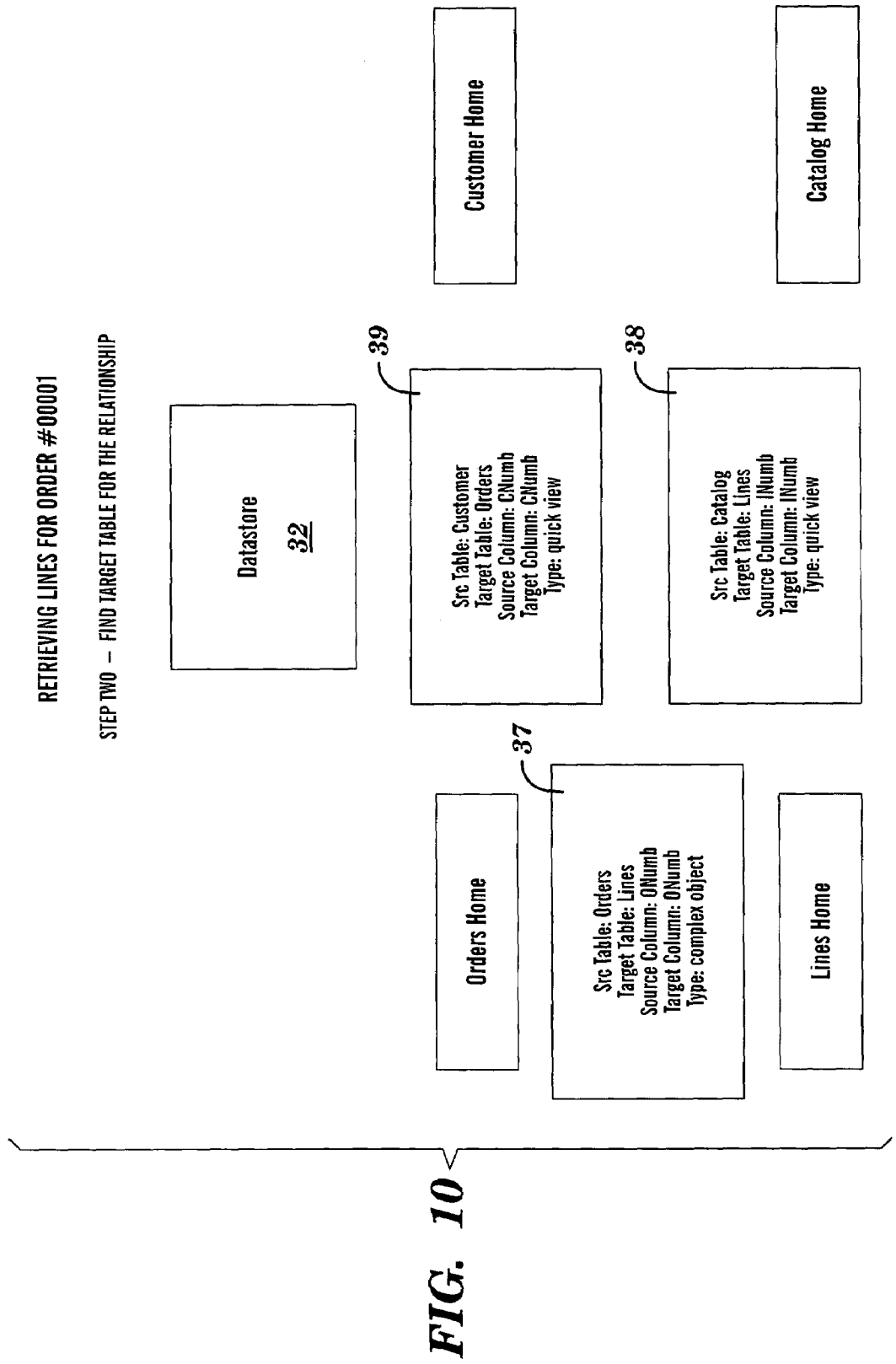

In FIG. 10, step 2 finds the target table Lines, given the relationship 37 and the source table Orders 33.

Figure 11:
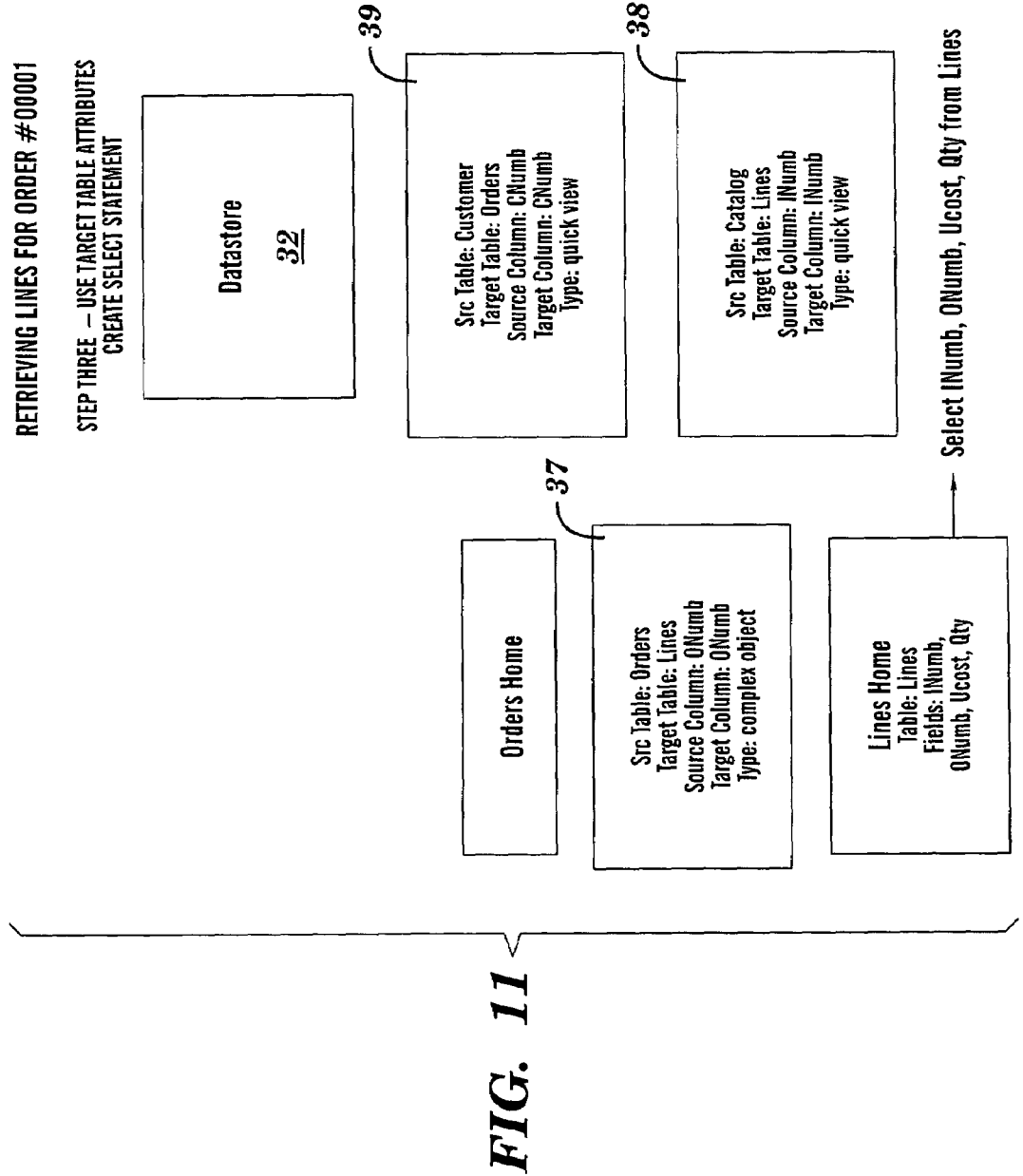

In FIG. 11, step 3 uses attributes of INumb, ONumb, Ucost, and Qty of the target table Lines to initiate generation of a Select statement for retrieving data pertaining to said attributes from the Lines table.

Figure 12:
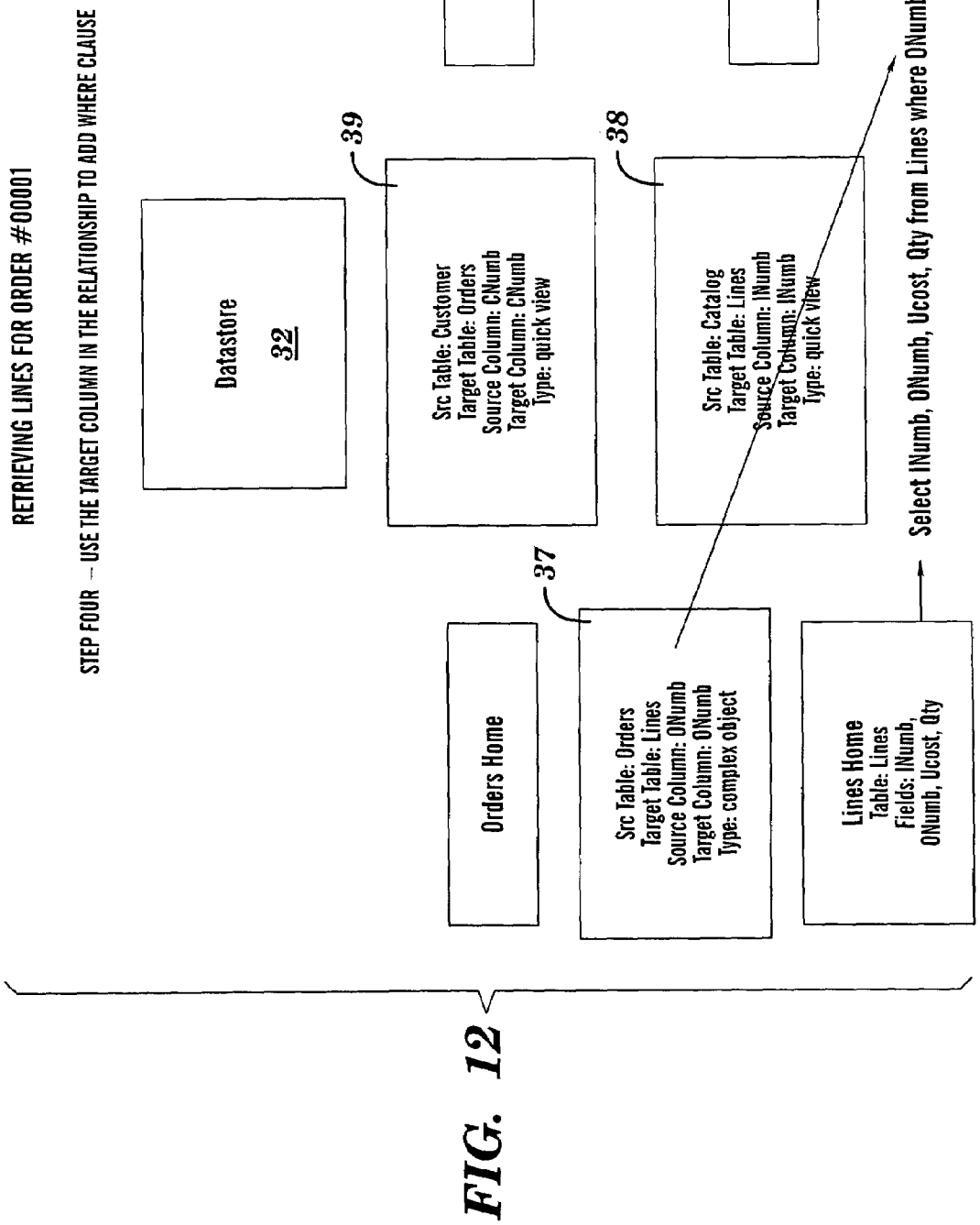

In FIG. 12, step 4 uses the column ONumb of the target table Lines to add a "where" clause to the Select statement of FIG. 11.

Figure 13:
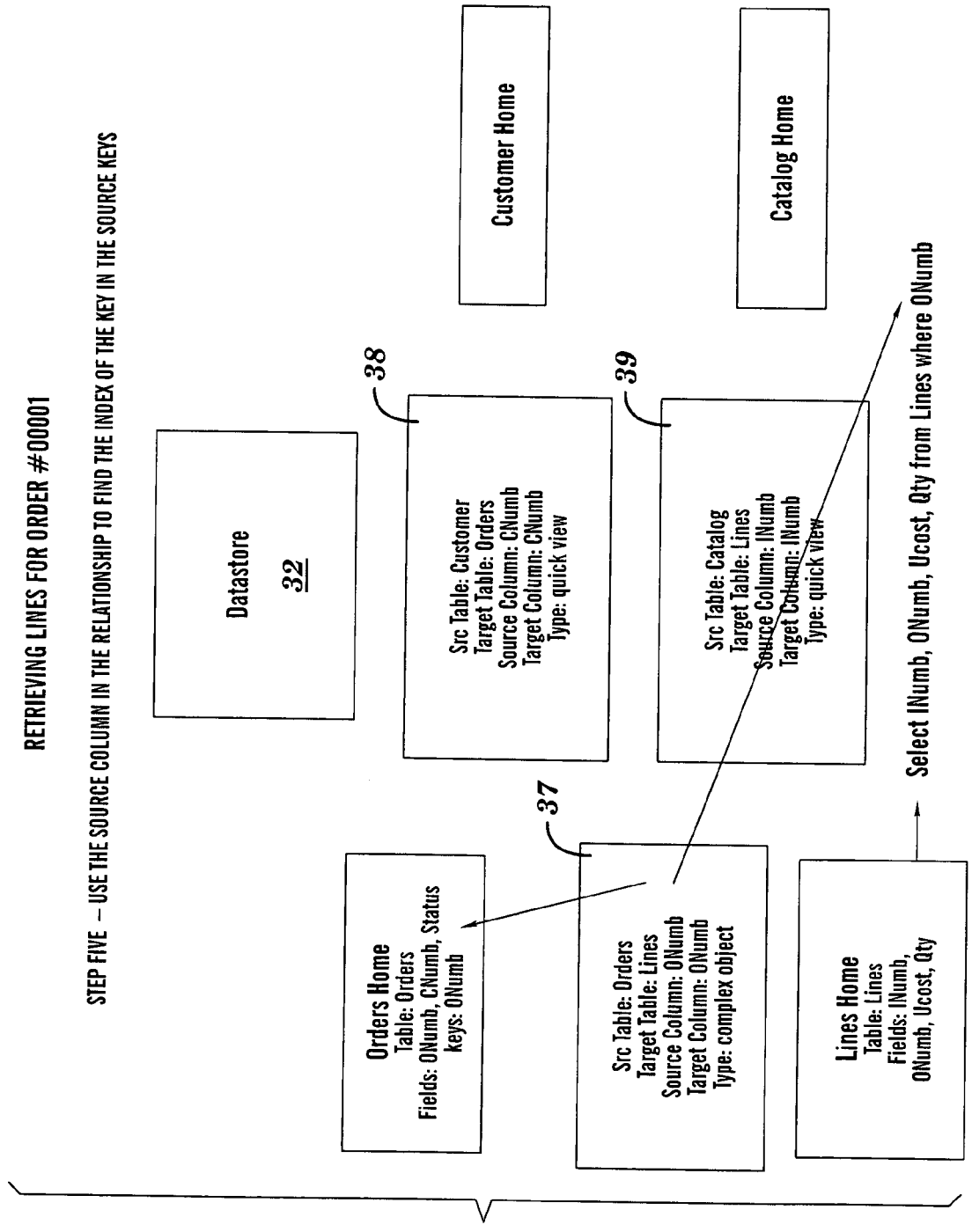

In FIG. 13, step 5 uses the source column ONumb in the relationship 37 to find the key index of the ONumb key in the source keys.

Figure 14:
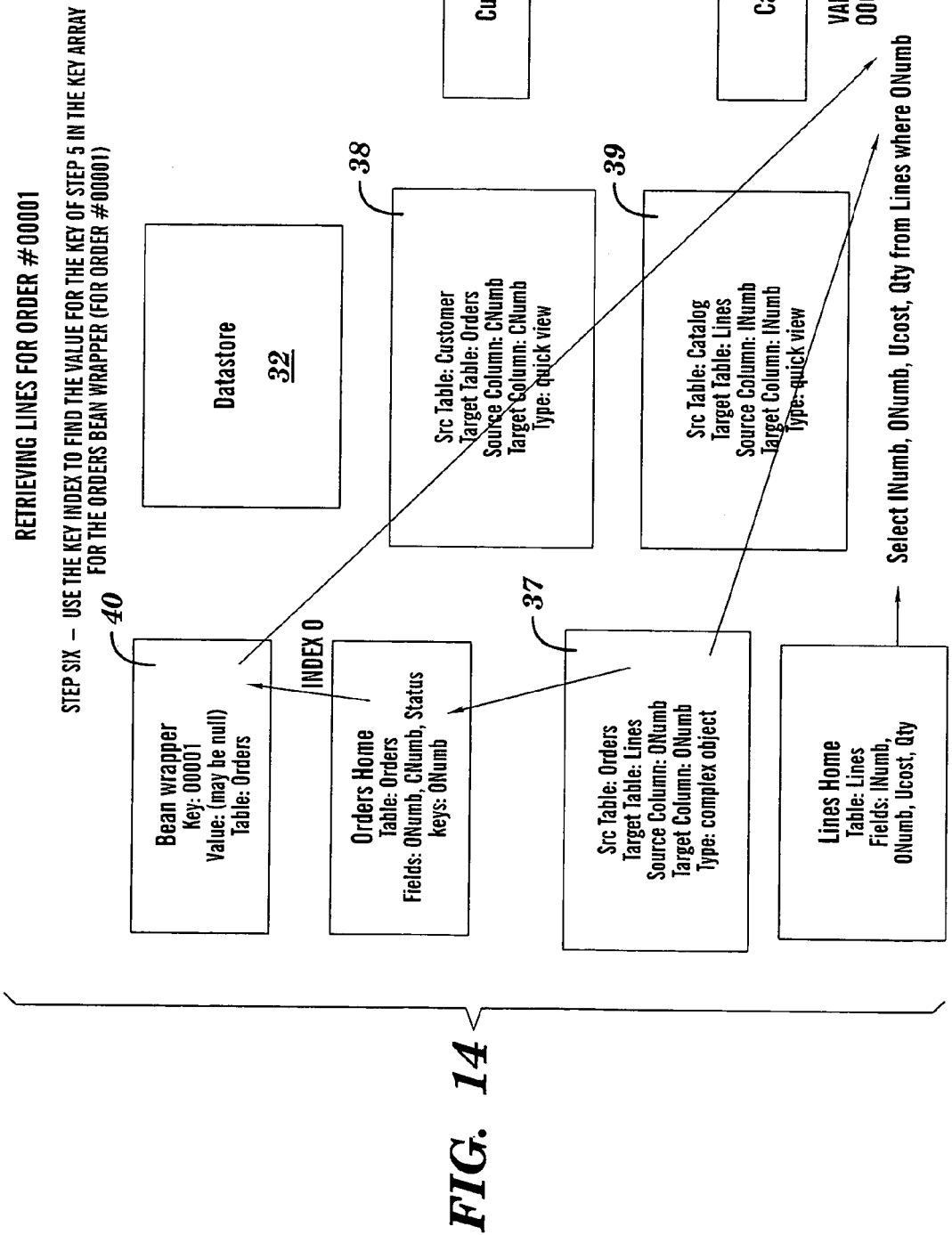

In FIG. 14, step 6 uses the key index (0) found in step 5 to find the key in the key array for the Orders bean wrapper 40 for the Order #O0001.

Figure 15:
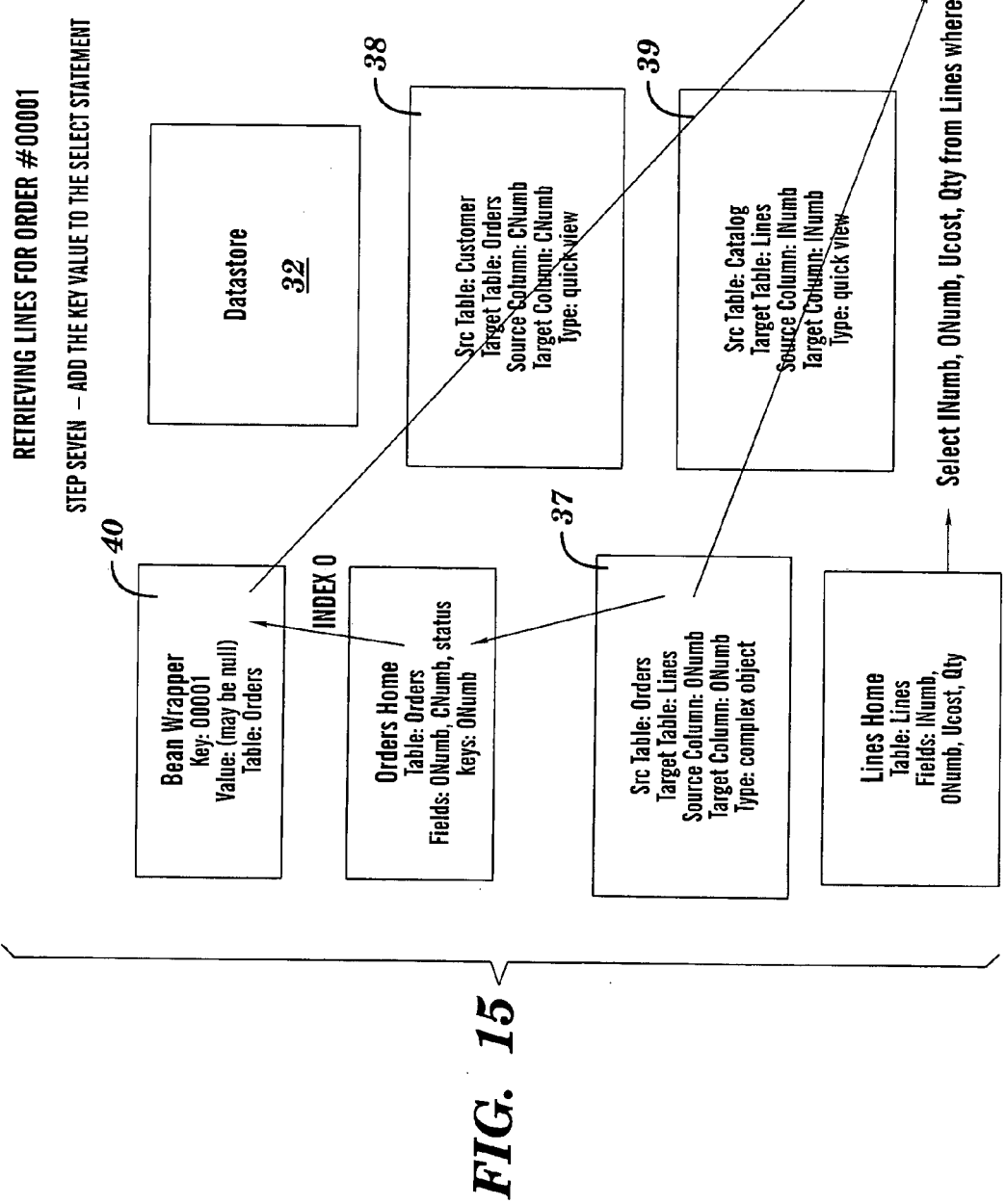

In FIG. 15, step 7 adds the key value O0001 to the Select statement of FIG. 14 to form the final form of the Select statement.

Figure 16:
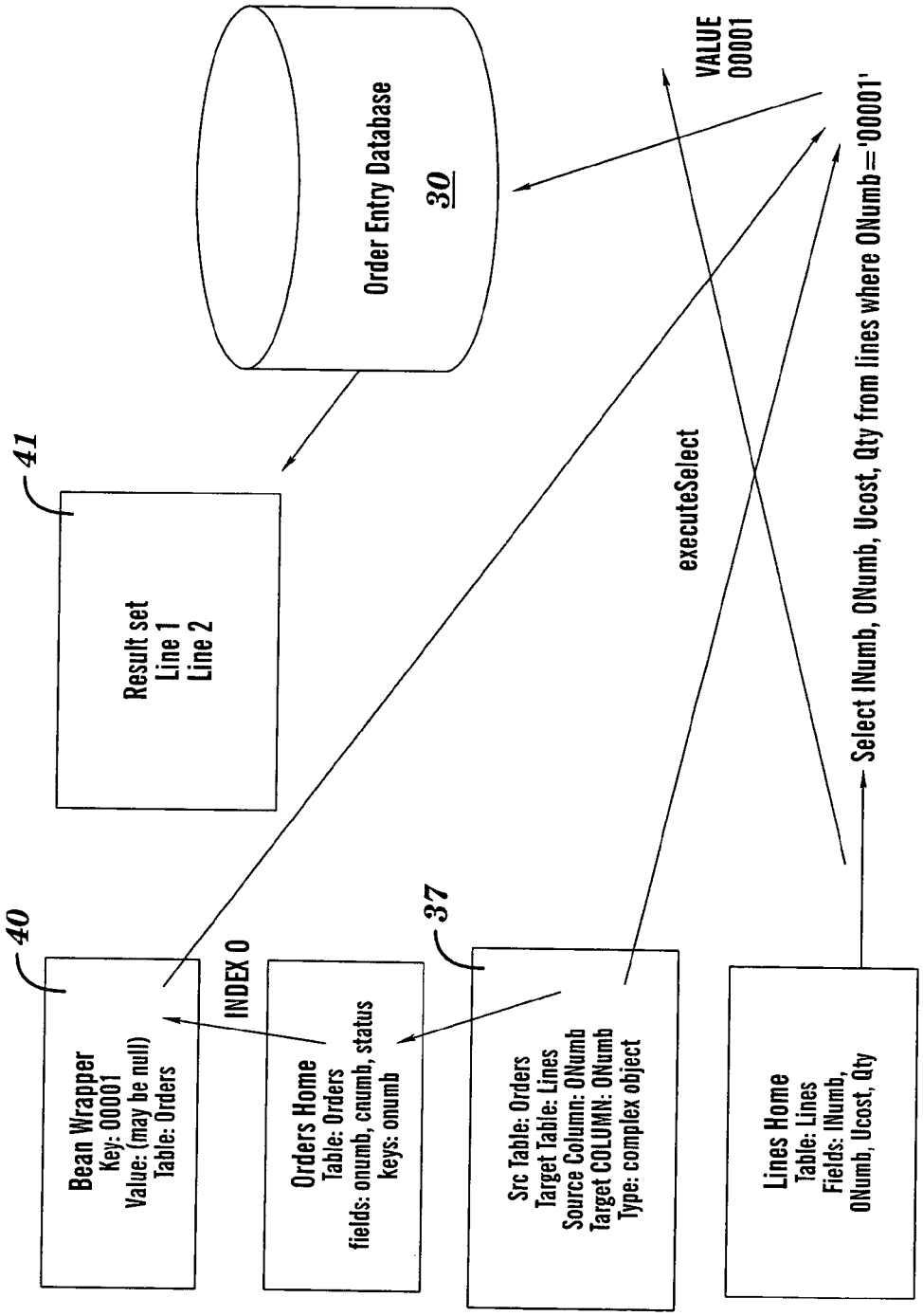

In FIG. 16, step 8 executes the Select statement formed in step 15 to retrieve the result set 41 (i.e., lines or rows for the attributes INumb, ONumb, Ucost, and Qty of the Lines table) of the database 30.

Figure 17:
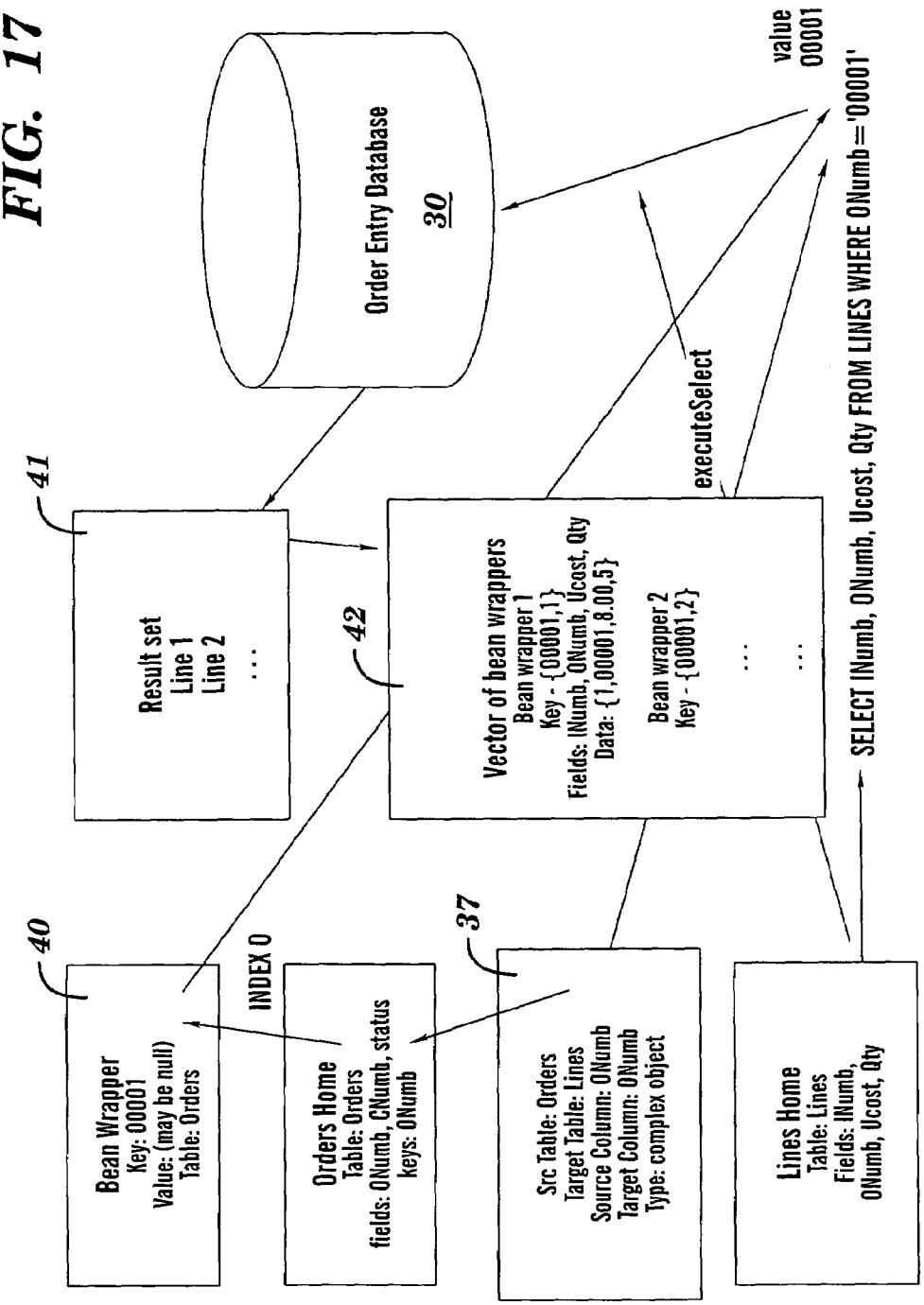

In FIG. 17, step 9 creates a vector of bean wrappers 42 for the result set 41.

FIGS. 18–21 depicts sequential steps A, B, C, and D, respectively, of a runtine process of retrieving a list of orders.

Figure 18:
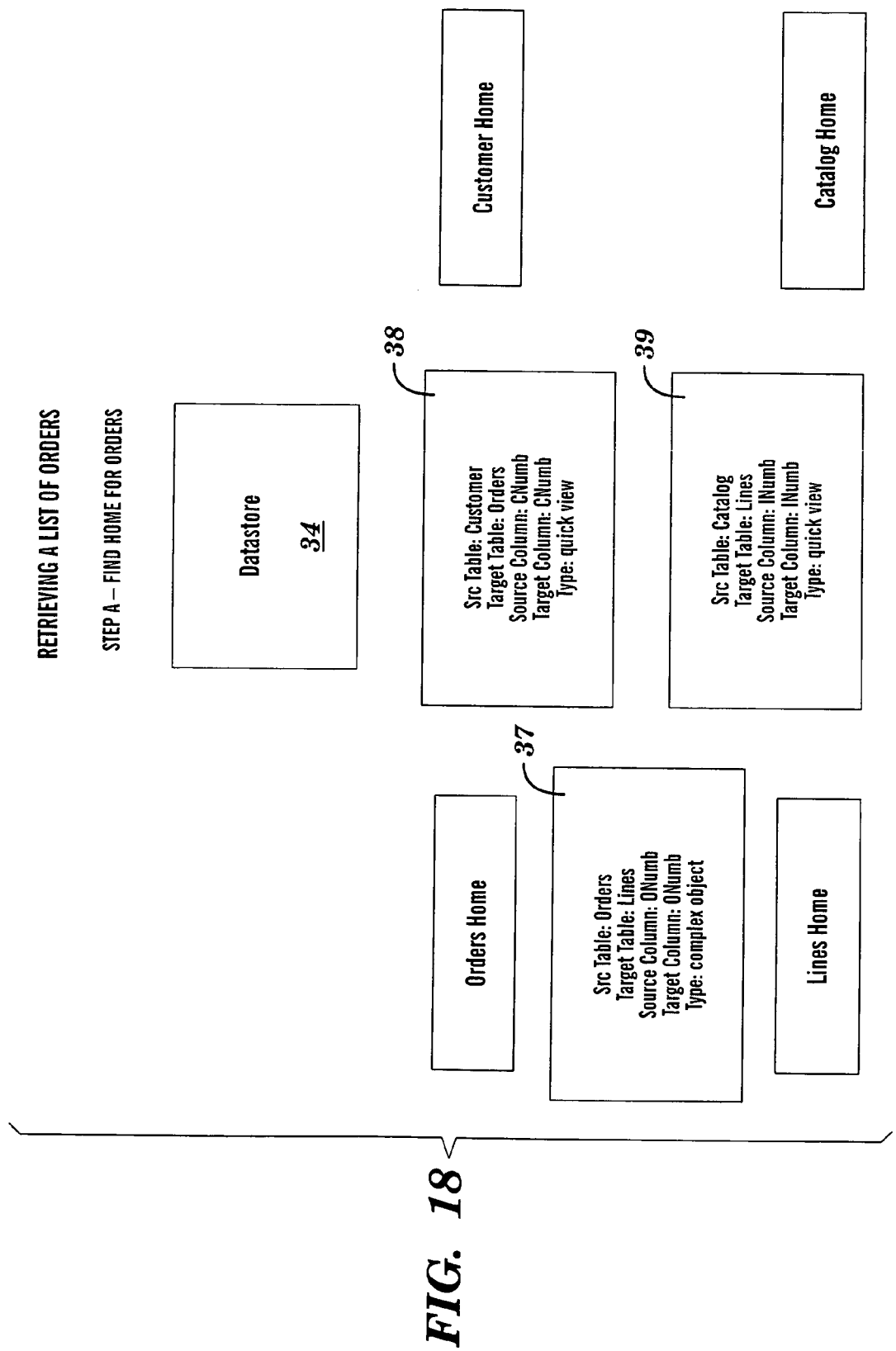
FIGS. 18–21 sequential steps relating to a runtime process of retrieving a list of orders for the Example of FIGS. 2–4, in accordance with embodiments of the present invention.

In FIG. 18, step A finds the home for the Orders table. FIG. 18 also shows the Lines, Customer and Catalog homes, as well as the relationships 37–39. The datastore is represented as the Datastore 34.

Figure 19:
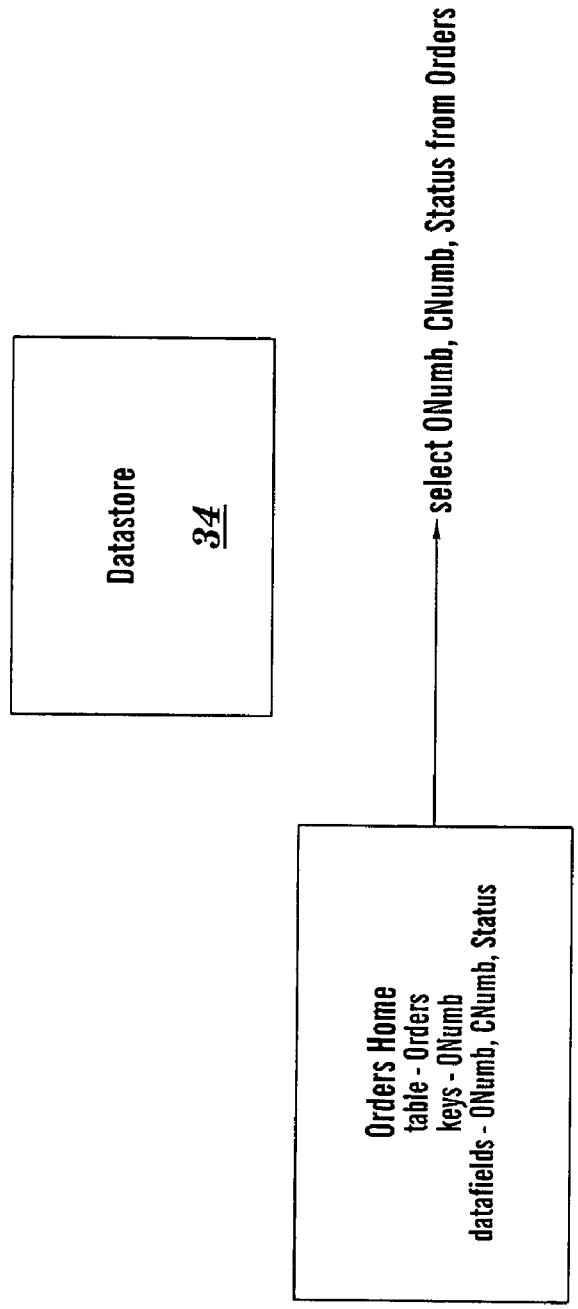

In FIG. 19, step B uses attributes of ONumb, CNumb, and Status from the Orders table to initiate generation of a Select statement for retrieving data pertaining to said attributes from the Orders table.

Figure 20:
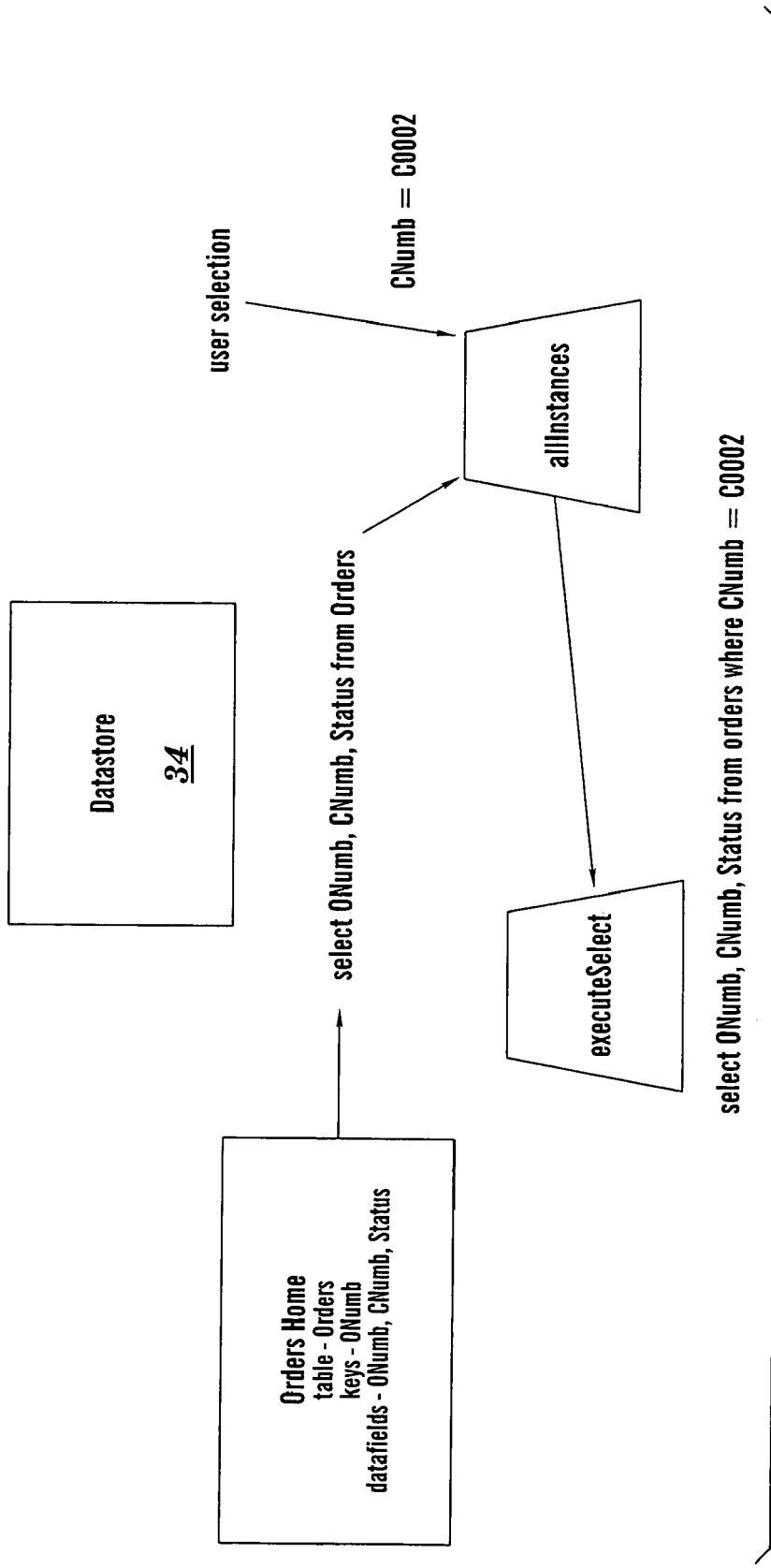

In FIG. 20, step C performs the bean implementor allInstancesmethod to add selection criteria (where CNumb=C0002) to complete formation of the Select statement of FIG. 19. Then step C executes the Select statement to retrieve the result set 45 of orders shown in FIG. 21.

Figure 21:
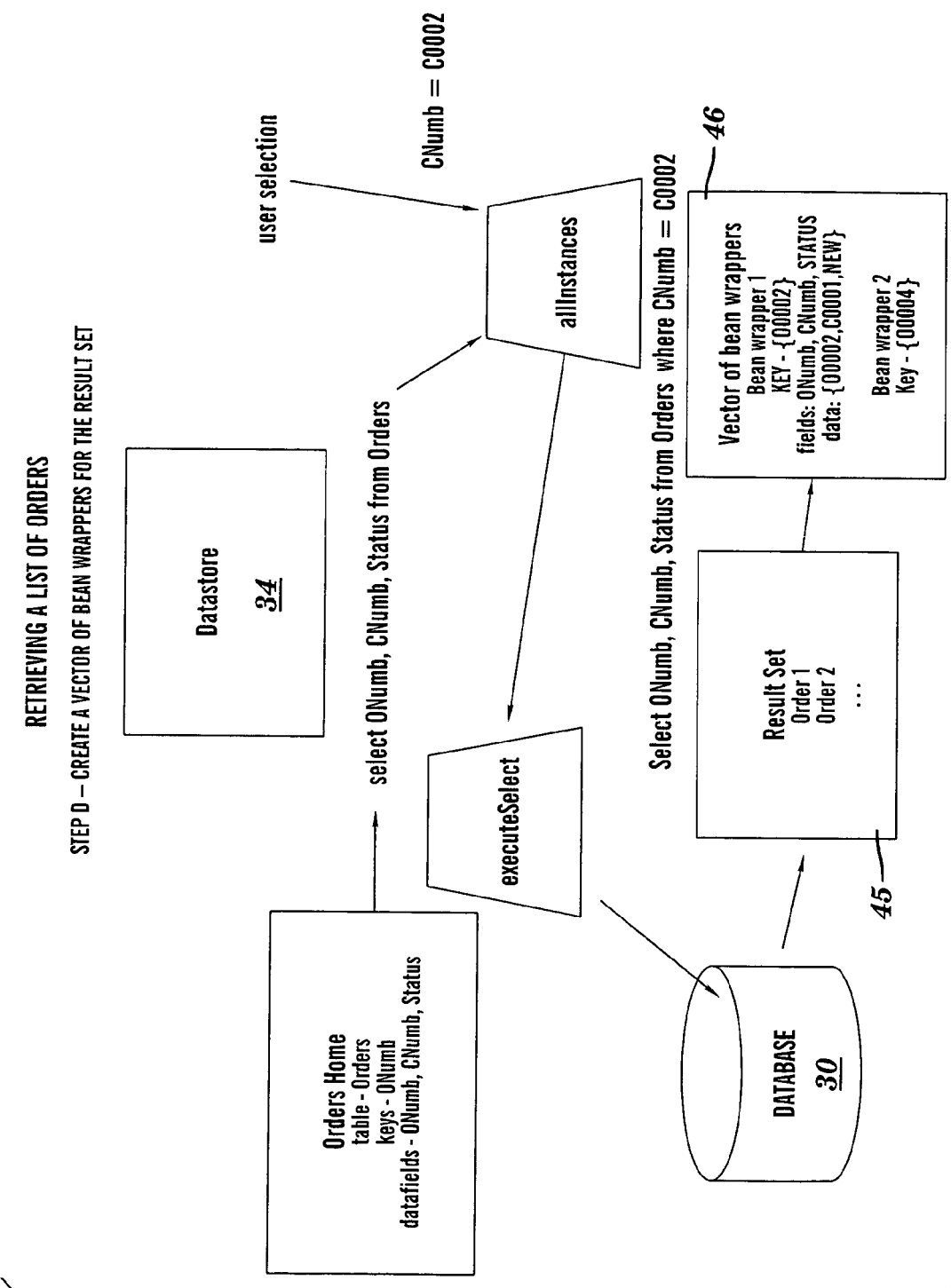

In FIG. 21, step D creates a vector of bean wrappers 46 for the result set 45.

Computer System

Figure 25:
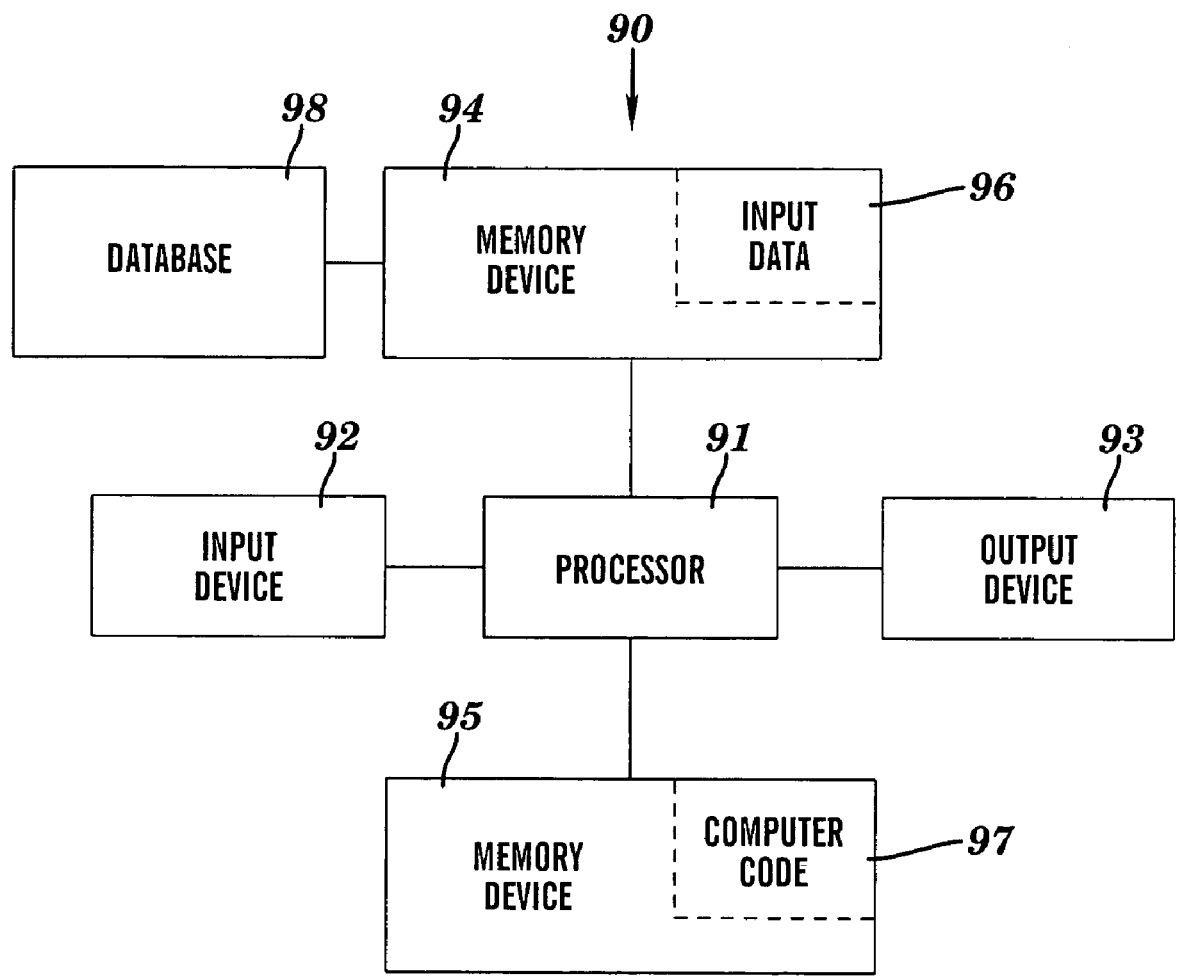
FIG. 25 illustrates a computer system for implementing the simple persistence mechanism of the present invention.

FIG. 25 illustrates a computer system 90 for implementing the simple persistence mechanism of the present invention. The computer system 90 comprises a processor 91, an input device 92 coupled to the processor 91, an output device 93 coupled to the processor 91, and memory devices 94 and 95 each coupled to the processor 91. The memory devices 94 and 95 are computer readable. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithm(s) or other computer readable program code for implementing the simple persistence mechanism of the present invention. The processor 91 executes the computer code 97. The memory device 94 includes input data 96. The memory device 94 includes or is coupled to a database 98 which may relate to the database 30 of FIGS. 2–21. The input data 96 includes input required by the computer code 97. The output device 93 displays output from the computer code 97 (e.g., the graphical interface of FIG. 13). Either or both memory devices 94 and 95 (or one or more additional memory devices not shown in FIG. 25) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 25 shows the computer system 90 as a particular configuration of hardware and software, any configuration of hardware and software, as would be known to a person of ordinary skill in the art, may be utilized for the purposes stated supra in conjunction with the particular computer system 90 of FIG. 25. For example, the memory devices 94 and 95 may be portions of a single memory device rather than separate memory devices. As another example, the hardware and software environment of FIG. 24, discussed supra, may be utilized.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An object oriented method for implementing a persistence mechanism, said persistence mechanism adapted to effectuate data transfer between a software application and a relational database, said method comprising the steps of:

identifying homes and relationships, each identified home comprising attributes of a table of the database, each identified relationship having attributes describing an interaction between two homes of said identified homes;

providing a datastore that is associated to the database, said datastore including attributes, said attributes of the datastore comprising the attributes of the identified homes and the attributes of the identified relationships;

providing a single home class adapted to be instantiated to any one of said identified homes;

providing a single relationship class adapted to be instantiated to any one of said identified relationships;

generating a query to transfer data between the application and the database, said generating comprising processing a first home of said identified homes, said first home comprising attributes of a first table of the database, said processing the first home comprising instantiating the home class to an instance of the first home by setting attributes of the first home.

2. The method of claim 1, wherein the method does not comprise providing more than one class in relation to the identified homes.

3. The method of claim 2, wherein the method further comprises generating a text document, wherein the text document includes attributes of the datastore which comprise the attributes of the identified homes and the attributes of the identified relationships, and wherein setting the attributes of the first home comprises extracting the attributes of the first home from the text document.

4. The method of claim 3, wherein the text document is a extensible Markup Language (XML) document.

5. The method of claim 1, wherein the query is adapted to transfer data from the application to at least one row of the first table.

6. The method of claim 5, wherein the at least one row does not include all rows of the first table.

7. The method of claim 1, wherein the query is adapted to transfer data from at least one row of the first table to the application.

8. The method of claim 7, wherein the at least one row does not include all rows of the first table.

9. The method of claim 7, wherein the method further comprises:
executing the query to generate a result set; and
looping through the result set to create a list of objects holding the data transferred from the at least one row.

10. The method of claim 1, wherein said generating further comprises:
creating by lazy initialization a list of source relationships of said identified relationships in which the first home is a source home; and
creating by lazy initialization a list of target relationships of said identified relationships in which the first home is a target home.

11. The method of claim 1, wherein the first home is a target home, and wherein said generating further comprises finding a relationship of said identified relationships for a given source role.

12. The method of claim 1, wherein the first home is a source home, and wherein said generating further comprises finding a relationship of said identified relationships for a given a source role.

13. The method of claim 1, wherein said generating further comprises finding a source row for a given target row and given relationship of said identified relationships.

14. The method of claim 13, wherein the given relationship comprises a key field that contains a data value, and wherein said generating comprises transferring the data value from the key field to the query so as to limit the number of rows of the first table processed via the query.

15. The method of claim 1, wherein said generating further comprises finding at least one target row for a given source row and given relationship of said identified relationships.

16. The method of claim 15, wherein the given relationship comprises a key field that contains a data value, and wherein said generating comprises transferring the data value from the key field to the query so as to limit the number of rows of the first table processed via the query.

17. The method of claim 16, wherein key fields comprising said key field are adapted to be serialized and maintained between successive sessions during which the method is deployed such that data associated to each of said key fields does not have to be reconstituted in said successive sessions.

18. The method of claim 1, wherein the method further comprises providing a visual editor adapted to permit:
visual editing of the attributes of the identified homes; and
visual editing of the attributes of the identified relationships.

19. The method of claim 1, wherein the step of identifying homes and relationships comprises importing schema from the database, and wherein the attributes of the homes and relationships are derived from said schema.

20. The method of claim 1, wherein the method further comprises exporting to the database schema definitions relating to a home of the identified homes.

21. A computer system comprising a processor and a computer readable memory unit coupled to the processor, said memory unit containing instructions that when executed by the processor perform an object oriented method for implementing a persistence mechanism, said persistence mechanism adapted to effectuate data transfer between a software application and a relational database, said method comprising the computer implemented steps of:
identifying homes and relationships, each identified home comprising attributes of a table of the database, each identified relationship having attributes describing an interaction between two homes of said identified homes;
providing a datastore that is associated to the database, said datastore including attributes, said attributes of the datastore comprising the attributes of the identified homes and the attributes of the identified relationships;
providing a single home class adapted to be instantiated to any of said identified homes;
providing a single relationship class adapted to be instantiated to any one of said identified relationships;
generating a query to transfer data between the application and the database, said generating comprising processing a first home of said identified homes, said first home comprising attributes of a first table of the database, said processing the first home comprising instantiating the home class to an instance of the first home by setting attributes of the first home.

22. The computer system of claim 21, wherein the method does not comprise providing more than one class in relation to the identified homes.

23. The computer system of claim 22, wherein the method further comprises generating a text document, wherein the text document includes attributes of the datastore which comprise the attributes of the identified homes and the attributes of the identified relationships, and wherein setting the attributes of the first home comprises extracting the attributes of the first home from the text document.

24. The computer system of claim 23, wherein the text document is a eXtensible Markup Language (XML) document.

25. The computer system of claim 21, wherein the query is adapted to transfer data from the application to at least one row of the first table.

26. The computer system of claim 25, wherein the at least one row does not include all rows of the first table.

27. The computer system of claim 21, wherein the query is adapted to transfer data from at least one row of the first table to the application.

28. The computer system of claim 27, wherein the at least one row does not include all rows of the first table.

29. The computer system of claim 27, wherein the method further comprises:
executing the query to generate a result set; and
looping through the result set to create a list of objects holding the data transferred from the at least one row.

30. The computer system of claim 21, wherein said generating further comprises:
creating by lazy initialization a list of source relationships of said identified relationships in which the first home is a source home; and
creating by lazy initialization a list of target relationships of said identified relationships in which the first home is a target home.

31. The computer system of claim 21, wherein the first home is a target home, and wherein said generating further comprises finding a relationship of said identified relationships for a given source role.

32. The computer system of claim 21, wherein the first home is a source home, and wherein said generating further comprises finding a relationship of said identified relationships for a given a source role.

33. The computer system of claim 21, wherein said generating further comprises finding a source row for a given target row and given relationship of said identified relationships.

34. The computer system of claim 33, wherein the given relationship comprises a key field that contains a data value, and wherein said generating comprises transferring the data value from the key field to the query so as to limit the number of rows of the first table processed via the query.

35. The computer system of claim 21, wherein said generating further comprises finding at least one target row for a given source row and given relationship of said identified relationships.

36. The computer system of claim 35, wherein the given relationship comprises a key field that contains a data value, and wherein said generating comprises transferring the data value from the key field to the query so as to limit the number of rows of the first table processed via the query.

37. The computer system of claim 36, wherein key fields comprising said key field are adapted to be serialized and maintained between successive sessions during which the method is deployed such that data associated to each of said key fields does not have to be reconstituted in said successive sessions.

38. The computer system of claim 21, wherein the method further comprises providing a visual editor adapted to permit:

visual editing of the attributes of the identified homes; and visual editing of the attributes of the identified relationships.

39. The computer system of claim 21, wherein the step of identifying homes and relationships comprises importing schema from the database, and wherein the attributes of the homes and relationships are derived from said schema.

40. The computer system of claim 21, wherein the method further comprises exporting to the database schema definitions relating to a home of the identified homes.

* * * * *